US011468397B2

(12) United States Patent
Dautz et al.

(10) Patent No.: US 11,468,397 B2
(45) Date of Patent: Oct. 11, 2022

(54) DELIVERY VEHICLE FOR DELIVERING CONSIGNMENTS TO A CONSIGNMENT CABINET, AND CONSIGNMENT CABINET FOR RECEIVING, STORING AND REISSUING CONSIGNMENTS

(71) Applicants: Christoph Dautz, Bonn (DE); Markus von Gostomski, Bonn (DE); Florian Markert, Bonn (DE); Jasmin Quill, Aachen (DE)

(72) Inventors: Christoph Dautz, Bonn (DE); Markus von Gostomski, Bonn (DE); Florian Markert, Bonn (DE); Jasmin Quill, Aachen (DE)

(73) Assignee: Deutsche Post AG, Bonn (DE)

( * ) Notice: Subject to any disclaimer, the term of this patent is extended or adjusted under 35 U.S.C. 154(b) by 506 days.

(21) Appl. No.: 16/244,999

(22) Filed: Jan. 10, 2019

(65) Prior Publication Data
US 2019/0213541 A1   Jul. 11, 2019

(30) Foreign Application Priority Data

Jan. 10, 2018   (DE) .................... 10 2018 100 447.8

(51) Int. Cl.
*G06Q 10/08*   (2012.01)
*B60P 3/00*   (2006.01)
(Continued)

(52) U.S. Cl.
CPC .......... *G06Q 10/0836* (2013.01); *B60P 3/007* (2013.01); *B65G 67/04* (2013.01); *B65G 67/24* (2013.01); *G06Q 10/083* (2013.01)

(58) Field of Classification Search
CPC .... G06Q 10/0836; B65G 67/04; B65G 67/67; B65G 67/24; B65G 65/00; G05D 1/0088;
(Continued)

(56) References Cited

U.S. PATENT DOCUMENTS 3,638,450 A * 2/1972 Falk ........................ B60P 3/205
                                                           62/329
3,998,343 A * 12/1976 Fors ........................ B60P 1/006
                                                           414/501
(Continued)

FOREIGN PATENT DOCUMENTS

CN   105084019 A   11/2015
CN   105172937 A   12/2015
(Continued)

OTHER PUBLICATIONS

Checkers (image on website); Feb. 8, 2005; URL: https://www.sec.gov/Archives/edgar/data/879554/000119312505025219/dex991.htm.*

(Continued)

*Primary Examiner* — George Chen
(74) *Attorney, Agent, or Firm* — Reinhart Boerner Van Deuren P.C.

(57) ABSTRACT

Described and presented is a delivery vehicle having a consignment store for receiving, storing and reissuing consignments, having a handover device for handing over consignments from the consignment store to a displacing device, and having a control device for controlling at least the displacing device. The displacing device is designed for delivering consignments to a location outside the delivery vehicle by displacing the consignments and so as to be adjustable from a retracted position into a deployed position and back, and the displacing device is designed to be height-adjustable for delivering consignments at different height levels outside the delivery vehicle.

19 Claims, 10 Drawing Sheets

(51) Int. Cl.
*B65G 67/04* (2006.01)
*B65G 67/24* (2006.01)

(58) Field of Classification Search
CPC .......... G05D 1/0225; G05D 2201/0216; B60P 1/5438; B60P 1/02; B60P 7/10; B25J 1/04; G07B 2017/00209; A47G 29/14; A47G 29/141; A47G 29/1209; A47G 29/12; A47G 29/1203; A47G 29/16; A47G 29/1201; A47G 2029/1257; A47G 2029/148; A47G 29/1251; A47G 29/1218; A47G 2029/142; B65F 1/12; B65F 1/1607; B65F 1/004

See application file for complete search history.

(56) References Cited

U.S. PATENT DOCUMENTS

| | | | |
|---|---|---|---|
| 4,193,511 A | | 3/1980 | Taber |
| 4,204,466 A | * | 5/1980 | Schnee .................... A21B 7/00 99/352 |
| 7,182,246 B1 | | 2/2007 | Sievel |
| 2007/0125727 A1 | | 6/2007 | Winkler |
| 2015/0186840 A1 | * | 7/2015 | Torres ..................... A47F 10/02 705/339 |
| 2016/0235236 A1 | | 8/2016 | Byers et al. |
| 2017/0322555 A1 | * | 11/2017 | Nikolic ................ G05D 1/0088 |
| 2018/0079601 A1 | * | 3/2018 | Khong ................... B65G 47/49 |
| 2018/0158018 A1 | * | 6/2018 | Luckay ................ G01C 21/343 |
| 2018/0174099 A1 | * | 6/2018 | Winkle ............. G06Q 10/0832 |

FOREIGN PATENT DOCUMENTS

| | | | | |
|---|---|---|---|---|
| CN | 105730959 A | | 7/2016 | |
| CN | 105947518 A | | 9/2016 | |
| CN | 206287902 U | | 6/2017 | |
| CN | 107055030 A | | 8/2017 | |
| CN | 206634709 U | | 11/2017 | |
| DE | 198 09 291 A1 | | 9/1999 | |
| DE | 20 2004 000 247 U1 | | 6/2005 | |
| DE | 10 2014 106 689 A1 | | 11/2015 | |
| DE | 20 2016 005 621 U1 | | 11/2016 | |
| DE | 10 2016 106 456 A1 | | 10/2017 | |
| EP | 2 944 512 A1 | | 11/2015 | |
| EP | 3 121 775 A1 | | 1/2017 | |
| GB | 2544657 A | | 5/2017 | |
| JP | 2002-142960 A | | 5/2002 | |
| JP | 6164599 B1 | | 7/2017 | |
| JP | 2018020423 A | * | 2/2018 | |
| WO | WO-2011155821 A1 | * | 12/2011 | ............. B65G 1/127 |
| WO | WO 2012/083057 A1 | | 6/2012 | |
| WO | WO 2014/080389 A2 | | 5/2014 | |
| WO | WO-2016144254 A1 | * | 9/2016 | ................ B64F 1/32 |
| WO | WO 2017/041145 A1 | | 3/2017 | |
| WO | WO 2017/085316 A1 | | 5/2017 | |

OTHER PUBLICATIONS

Cartoning Machine (video); Oct. 23, 2015; URL: https://www.youtube.com/watch?v=BHvHMGOqgoA.*

* cited by examiner

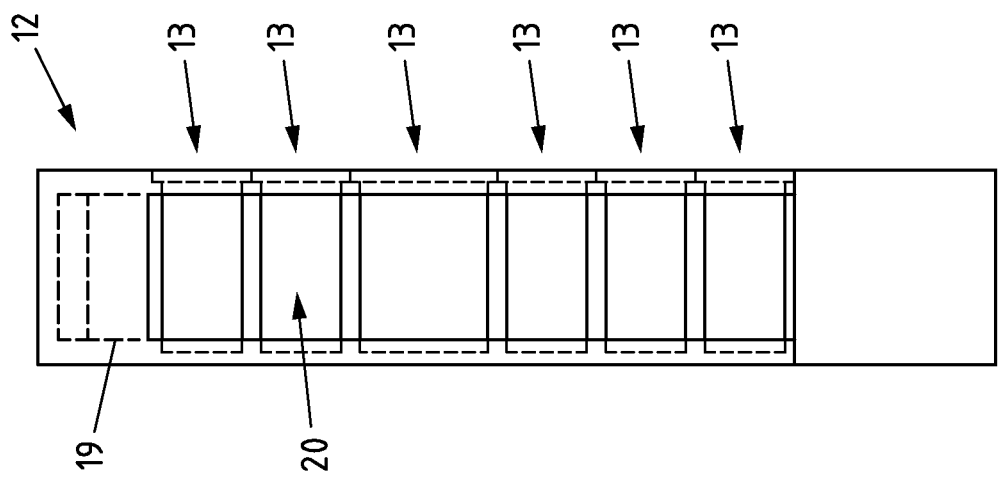
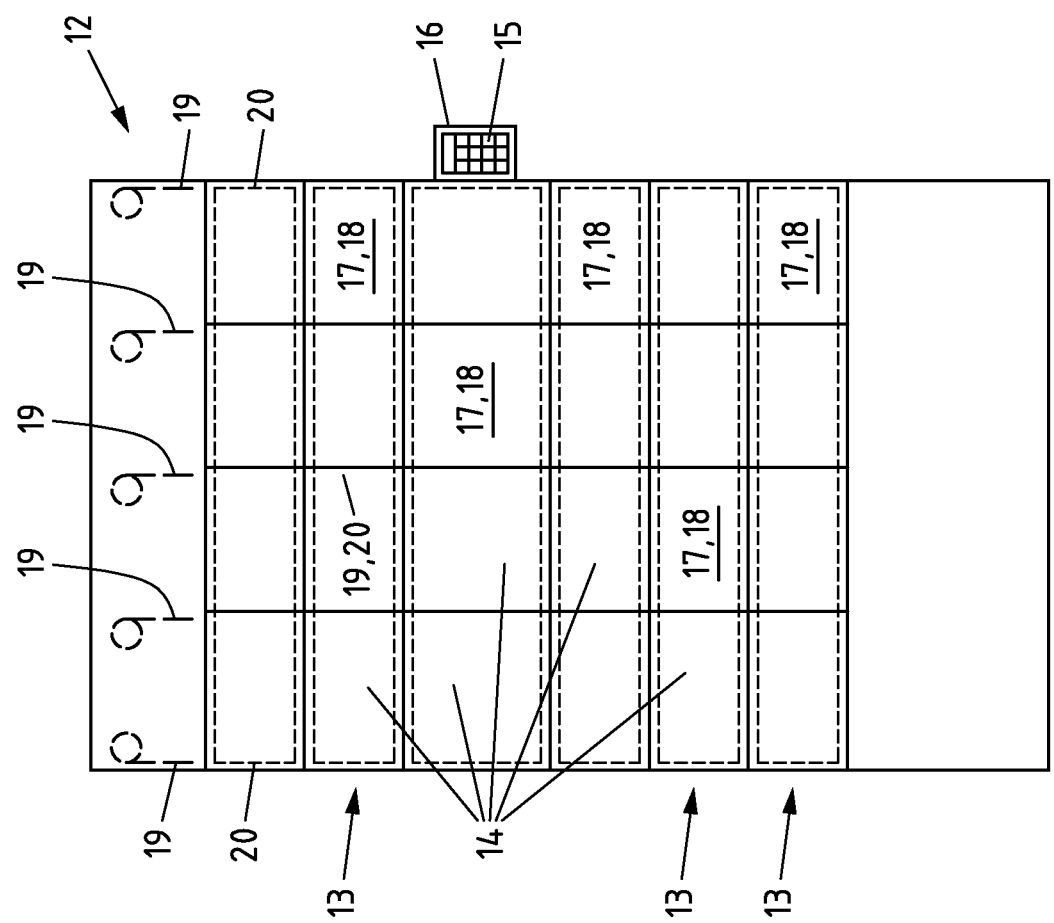
Fig.4B
Fig.4A

DELIVERY VEHICLE FOR DELIVERING CONSIGNMENTS TO A CONSIGNMENT CABINET, AND CONSIGNMENT CABINET FOR RECEIVING, STORING AND REISSUING CONSIGNMENTS

CROSS-REFERENCE TO RELATED PATENT APPLICATION

This patent application claims priority to German Application No. 10 2018 100 447.8, filed Jan. 10, 2018, the entire teachings and disclosure of which are incorporated herein by reference thereto.

FIELD

The invention relates to a delivery vehicle having a consignment store for receiving, storing and reissuing consignments, having a handover device for handing over consignments from the consignment store to a displacing device, and having a control device for controlling at least the displacing device. The invention also relates to a consignment cabinet for receiving and holding consignments for the separate retrieval thereof, having a multiplicity of consignment compartments which are arranged adjacent to one another at least in one row and which each serve for receiving at least one consignment, wherein at least substantially each consignment compartment has a front opening, wherein at least substantially each consignment compartment is assigned a front closure means which is adjustable between a removal position, in which it opens up the front opening for the removal of the consignment from the consignment compartment, and a closed position, in which it closes the front opening. Furthermore, the invention relates to a method for delivering consignments by means of a delivery vehicle of said type into a consignment cabinet of said type.

BACKGROUND

Delivery vehicles for delivering or targetedly delivering consignments are already known in a wide variety of embodiments. They have at least one consignment store in which the consignments to be delivered are initially received at a loading location of the delivery vehicle and are temporarily stored until being delivered or targetedly delivered. Many delivery vehicles are loaded by hand and also unloaded by hand. It is however sought to be able to receive a greater number of consignments in a consignment store, for which reason, in some cases, manual unloading is dispensed with. Furthermore, as required, delivery of the consignments without manual intervention is preferred. Then, the consignments are output from the consignment store via a handover device which hands the consignments over to an output device which ultimately outputs the consignments. The output device may for example be a displacing device which displaces the consignments out of the delivery vehicle. In this case, for the sake of simplicity, the displacement of the displacing device is controlled by a control device, such that the desired consignments are delivered or posted in the desired manner.

Furthermore, consignment cabinets, for example in the form of package cabinets or package stations, are known which can receive consignments, and hold them until they are retrieved, in separate consignment compartments. These consignment cabinets have consignment compartments which are arranged in multiple rows one above the other. The adjacent consignment compartments of the individual rows are typically separated from one another by a common side wall. To be able to place the consignments into the consignment compartments and remove them from the consignment compartments again, the consignment compartments each have a front opening, wherein "front" corresponds to the front side of the consignment cabinet. In order that the consignments can furthermore be removed only by authorized persons, the consignment compartments are also assigned front closure means which can each be adjusted from a removal position, in which they permit the removal of a consignment, into a closed position, in which they close off the front opening, and back.

When consignments are placed into the consignment cabinets, at least one front closure means is firstly unlocked by means of a control device of the consignment cabinet. The front closure means can then be adjusted into the removal position, and the consignment placed into the associated consignment compartment. The front closure means is then adjusted into the closed position again, and the closure means is locked. Furthermore, a piece of information is transmitted to the consignment cabinet regarding which consignment has been stored in the corresponding consignment compartment. Thus, after corresponding authentication at the consignment cabinet, the consignment compartment assigned to a particular consignment can be opened for a person retrieving the consignment by unlocking and adjustment of the associated front closure means into the removal position. The retrieving person removes the consignment and adjusts the front closure means into the closed position again.

It is basically also possible for a delivery vehicle to be used for filling the consignment compartments, if said delivery vehicle is capable of removing consignments from the consignment store and placing them into the consignment compartments through the opened front closure means. This is however very complicated and blocks the consignment cabinet over a considerable period of time, in which it is not possible for consignments to be retrieved by retrieving persons.

SUMMARY OF SOME EXEMPLARY EMBODIMENTS OF THE INVENTION

The present invention is based on the object of designing and further developing the delivery vehicle, the consignment cabinet and the method of the respective type mentioned in the introduction and discussed in more detail above such that the filling of the consignment compartments of a consignment cabinet can be performed more easily, without obstructing the removal of consignments over a relatively long period of time.

Said object is achieved, in the case of a delivery vehicle as per the present disclosure, in that the displacing device is designed for delivering consignments to a location outside the delivery vehicle by displacing the consignments and so as to be adjustable from a retracted position into a deployed position and back, and in that the displacing device is designed to be height-adjustable for delivering consignments at different height levels outside the delivery vehicle.

The invention has recognized that, by means of a displacing device which can be adjusted from a retracted position into a deployed position and back, it is expediently possible for consignments to be delivered outside the delivery vehicle. For this purpose, the consignments are displaced outside the delivery vehicle. The displacing device can thus for example displace the consignments outside the delivery vehicle specifically to such an extent that the consignments arrive at the desired location, in particular in the desired consignment compartment. To be able to place consignments in a very large number of different consignment compartments, the displacing device is furthermore designed to be height-adjustable. The consignment compartments then do not need to be arranged at a particular height level, and may, as required, be arranged at different height levels. The consignment compartments can then nevertheless be served, or occupied with consignments, by the displacing device.

The corresponding delivery vehicle may, as required, be a targeted-delivery vehicle. Targeted-delivery vehicles also serve for the delivery of consignments. In a manner dependent on the nature of the consignments, it is however possible to make a distinction between delivery and targeted delivery. In particular in cases in which it is the intention for only an authorized retrieving person to have access to a particular consignment, as is the case for example with packages or packets, this is referred to more as targeted delivery than as delivery. In other words, it is typical for consignments, in particular postal consignments, such as package consignments, letter consignments and/or printed products, to be targetedly delivered to their destination for example by a postal company, whereas other consignments are often delivered by delivery services. The boundaries between delivery and targeted delivery are rather blurred. Also, this boundary plays a rather secondary role for the present invention. Accordingly, in the present case, it does not appear to be necessary to define the boundary between targeted delivery and delivery exhaustively and beyond the description given above.

In the present case, consignments are basically to be understood to mean different articles which can preferably be transported with reasonable effort. In particular, the consignments may be in the form of piece goods. These may involve articles relating to daily requirements, such as consumable materials or foodstuffs, as well as technical articles and equipment. In many cases, the consignments are consignments of a postal company, which can be referred to as postal consignments. As required, the consignments are letter consignments, package consignments and/or flyers. Here, package consignments also encompass packets, whereas flyers may also be catalogues, brochures and magazines. Furthermore, a letter consignment may be not only a letter but also a postcard. Package consignments and other consignments are in many cases packaged items, wherein the consignment then encompasses the packaging and the item packaged therein.

The stated object is furthermore achieved by means of a consignment cabinet as per the present disclosure in that at least substantially each consignment compartment has at least one lateral opening, in that at least substantially each consignment compartment is assigned at least one lateral closure means which is adjustable between a closure position, in which it laterally closes the at least one consignment compartment, and a displacement position, in which it enables a consignment to be displaced in laterally, and in that the lateral closure means are at least substantially electrically driven.

The invention has furthermore recognized that a consignment cabinet can be very expediently loaded with consignments from the side if at least substantially each consignment compartment of at least one row of consignment compartments arranged adjacent to one another has at least one lateral opening. It is basically also possible for each consignment compartment which has a lateral opening to be supplied with a consignment via said lateral opening. If at least individual consignment compartments have two oppositely situated lateral openings, these consignment compartments can, as required, be loaded with a consignment from both opposite sides. The side from which the loading of the consignment compartments is performed can then, in a manner dependent on the accessibility to the consignment compartments, be utilized for receiving at least one consignment.

In order that a retrieving person is allowed access only to those consignments which are intended for being retrieved by the corresponding retrieving person, it is possible for at least substantially all of the lateral openings to be closed off by lateral closure means. For this purpose, the lateral closure means can be adjusted from a closure position, in which they laterally close off the at least one consignment compartment, into a displacement position, in which they allow a consignment to be displaced in laterally. Depending on the position of the closure means, a consignment can be displaced into a consignment compartment from the side, or else the unauthorised removal of a consignment can be prevented. Since it must be ensured that at least substantially all of the lateral closure means are situated in the desired position, or are adjusted into the respectively desired position, at all times, the lateral closure means are preferably electrically driven. It is thus possible, for example, to realize expedient control of the consignment cabinet by means of a control device of the consignment cabinet.

The control device may preferably likewise receive demand-related pieces of information which indicate which consignment is to be retrieved by an authorized retrieving person or which front closure means is to be adjusted from a closed position into a removal position for the retrieval of a particular consignment. The control device may furthermore check an authorization of the retrieving person. For this purpose, for example, a code is transmitted by means of which the retrieving person can prove their authorization for removing a consignment. The code may furthermore be directly linked to a consignment compartment, such that the control device identifies on the basis of the code which front closure means must be adjusted from the closed position into the removal position for the removal of a consignment. The control device may then cause and/or initiate this. For this purpose, the corresponding front closure means may be unlocked, such that the retrieving person can adjust the front closure means into the removal position in order to remove the consignment from the consignment compartment situated behind said front closure means. It is however also possible for the corresponding closure means to be adjusted into the removal position by means of an electric drive in a manner controlled by the control device. An additional unlocking may then, as required, be rendered unnecessary if the electric drive permanently prevents unauthorised opening of the front closure means. It is however also possible, as required, to dispense with an electric drive if the operator adjusts the front closure means by hand after the unlocking. Here, for example, the opening of the front closure means may be performed with assistance from a spring.

The above-stated object is furthermore achieved by means of a method for delivering consignments by means of a delivery vehicle, into a consignment cabinet, wherein the consignment cabinet has at least one row of consignment compartments which are arranged adjacent to one another and which serve for receiving at least one consignment, in which the delivery vehicle comes to a stop laterally adjacent to the consignment cabinet, in which a control device activates at least one lateral closure means assigned to at least one consignment compartment, in which the activation of the closure means is performed in a manner dependent on the distribution of the consignment compartments occupied with consignments and in order to adjust the closure means from a closure position, in which it closes off a lateral opening of the at least one consignment compartment, into a displacement position, in which it opens up the lateral opening, and in which a control device of the delivery vehicle activates at least one displacing device in order to displace a consignment into a consignment compartment with opened lateral opening.

The loading of consignment cabinets by delivery vehicles can be performed quickly and effectively without the front side of the consignment cabinets being blocked by the delivery vehicle such that a retrieving person may be refused access to the corresponding consignment compartment. Specifically, the delivery vehicle can come to a halt laterally adjacent to the consignment cabinet. During the loading of a consignment cabinet, it must be taken into consideration that the consignment cabinet may, in some consignment cabinets, have consignments that have not yet been retrieved, and these may be distributed arbitrarily across the consignment cabinet. Consequently, a control device is provided which controls the loading on the basis of the distribution of the consignment compartments laden with consignments. Here, for the sake of simplicity, the control device is part of the consignment cabinet. The control device may however also be provided outside the consignment cabinet. It is then furthermore expedient if the control device communicates with the consignment cabinet. The control device activates at least one lateral closure means assigned to at least one consignment compartment in order to adjust from a closure position, in which said lateral closure means closes off a lateral opening of the at least one consignment compartment, into a displacement position, in which said lateral closure means opens up the lateral opening. Thus, those lateral closure means which have to open up the corresponding openings for the loading of consignment compartments of the consignment cabinet from the side are opened. Then, a control device, in particular of the delivery vehicle, can activate at least one displacing device for displacing a consignment in order to displace the consignment into one of the laterally open consignment compartments.

For ease of understanding, and in order to avoid unnecessary repetition, the delivery vehicle, the consignment cabinet and the method will be described jointly below, without a distinction being made in each case in detail between the delivery vehicle, the consignment cabinet and the method. It is however obvious to a person skilled in the art from the context which feature is particularly preferred in each case with regard to the delivery vehicle, the consignment cabinet and the method.

In a first particularly preferred refinement of the delivery vehicle, the control device is designed for controlling the consignment store and/or the handover device. Then, the consignment store and/or the handover device are controllable as required without manual intervention. It can thus be ensured for example by means of the control device that the consignment that is to be delivered next is output from the consignment store, and/or the consignment that is to be delivered next is transferred from the handover device to the displacing device. Ultimately, in this way, it is thus possible for the consignments to be delivered individually and in a particular sequence, wherein it is preferably always known to the control device which individual consignment is presently being delivered and/or is to be delivered next.

If the delivery vehicle is designed as an autonomous delivery vehicle for the autonomous delivery of consignments to a delivery location, the delivery requires no manual intervention. This has the advantage that human error in the delivery of consignments can be avoided, and that the delivery can be performed highly effectively in accordance with predefined principles. Alternatively or in addition, the efficiency of the delivery of consignments can be increased if the autonomous delivery vehicle is designed to autonomously drive to a delivery location from a loading location of the delivery vehicle. Then, it is possible as required to dispense with an operating person or delivery person entirely, or for this person to be used only for monitoring purposes. Furthermore, more time thus remains available for the operating person or delivery person to perform further tasks while on the move.

In order that the displacing device does not impede the movement of the delivery vehicle from one consignment cabinet to another consignment cabinet or from a loading location to an unloading location, it is preferable if the displacing device is, in a retracted position, arranged entirely in the delivery vehicle. To be able to nevertheless deliver the consignments reliably and accurately to locations outside the delivery vehicle, in particular to be able to displace said consignments into a consignment compartment of a consignment cabinet, the displacing device may have a plunger unit which, in the deployed position, is arranged at least partially outside the delivery vehicle and which serves for displacing the consignments. By means of the plunger unit, the consignment can be displaced by virtue of the plunger unit being deployed. Here, the consignment may be displaced out of the delivery vehicle or may merely be displaced outside of the delivery vehicle. The former alternative however appears to be particularly preferred for the sake of simplicity.

To support the consignment at least in portions as it is displaced by the displacing device, the displacing device may have, in particular below the plunger unit, a ramp which is adjustable, in particular pivotable or movable, from a non-use position into a use position and back. The consignment to be delivered can thus for example lie on the ramp and be displaced along the ramp by the plunger unit. Since the consignment is to be delivered outside the delivery vehicle by means of the displacing device, it is particularly expedient if the ramp is designed for supporting a consignment, to be displaced by the displacing device, at least in portions outside the delivery vehicle.

It is furthermore simple and reliable if the displacing device, in particular the plunger unit, is designed for at least substantially linearly displacing a consignment. To be able to deliver the consignments reliably at different height levels outside the delivery vehicle, the ramp may be designed to be height-adjustable.

To be able to effectively utilize the space of the delivery vehicle, and in order to be able to receive the greatest possible number of consignments in the consignment store, the plunger unit may be designed to be telescopable between the non-use position and the use position. This telescopability can furthermore be achieved in a simple manner in terms of construction if the plunger unit comprises at least two, preferably cylindrical, telescopic elements which are collapsible and extendable relative to one another. Here, at least one telescopic element may be received at least in portions in at least one other telescopic element. During the collapsing of the plunger unit, it is then possible for the at least one telescopic element to be displaced into the at least one other telescopic element. Provision may however also be made for the telescopic elements to be arranged adjacent to one another and displaceable relative to one another. For the sake of further simplicity, the telescopic elements then partially engage into one another. Said portions may furthermore preferably form a type of rail system.

If the handover device has at least one, in particular height-adjustable, conveyor belt, the consignments can be transferred to the displacing device very easily and reliably. Alternatively or in addition, it is however also possible for at least one robot arm and/or at least one portal robot to be provided for this purpose. All of these devices can be utilized for conveying the consignments in the direction of the displacing device. If the handover device furthermore has a separating device, it can be ensured that a consignment is always delivered after the next. For the sake of simplicity, the separating device is in the form of a conveyor belt, if required an acceleration conveyer belt, and/or of a separating blade, which is adjustable from a non-use position into a use position in contact with at least one consignment and back. If the separating blade is in the use position, further consignments are stopped by coming into contact with the separating blade. If the separating blade is in the non-use position, the upcoming consignments are issued for onward transport.

In particular in the case of autonomous delivery vehicles, these preferably have at least one sensor for detecting a consignment cabinet for the delivery of consignments in the consignment cabinet. This may be an optical sensor. The sensor makes it possible for the delivery vehicle to drive independently to a location directly adjacent to the consignment cabinet without colliding with the latter. The delivery vehicle can thus preferably assume a predefined relative position with respect to the consignment cabinet. Alternatively or in addition, the delivery vehicle may also have at least one sensor for detecting a height level for the delivery of consignments by means of the displacing device, for example in the form of a height level of a row of consignment compartments of a consignment cabinet. The sensor can thus determine how far the displacing device, the ramp, the plunger unit and/or the handover device must be adjusted upward or downward, for example in order to arrive at the height level of a row of consignment compartments of a consignment cabinet. The sensor may however also detect whether or not the displacing device, the ramp, the plunger unit and/or the handover device has reached the desired position. It would basically also be possible for the consignment cabinet to comprise a corresponding sensor, and for the delivery vehicle to then receive corresponding control commands for the height adjustment of the displacing device, of the ramp, of the plunger unit and/or of the handover device. This may also be the same sensor as the sensor for identifying the consignment cabinet. The delivery vehicle can thus adapt the height adjustment of the displacing device to the detected height level of the consignment cabinet, wherein this may be a height level of at least one consignment compartment or of a row of consignment compartments.

If at least one sensor for detecting the position of the displacing device, in particular of the plunger unit, during the delivery of the consignments is provided, the delivery vehicle knows when the consignment has reached the desired position or the desired consignment compartment in the consignment cabinet, and the delivery vehicle can transmit the corresponding piece of information to the consignment cabinet as required. If at least one receiver device for receiving a piece of information relating to the location of the delivery of at least one consignment, in particular relating to a height level and/or a displacement distance, is provided, the delivery of the consignments by the delivery vehicle can be controlled in targeted fashion and adapted to the respective loading situation of a consignment cabinet. Alternatively or in addition, the delivery vehicle may also comprise a transmitter device for transmitting a piece of information relating to the completion of the delivery of a consignment, for example in order to inform the consignment cabinet regarding the completion of the delivery of a consignment. It may basically be particularly effective if pieces of information are transmitted for example via a local radio network or a mobile radio network, for example Bluetooth or Wireless Local Area Network (WLAN) and/or a mobile radio network, in particular Global System for Mobile Communication (GSM), Universal Mobile Telecommunications System (UMTS) and/or Long Term Evolution (LTE). Other ways of communication are known and may basically also be utilized.

In a first particularly preferred refinement of the consignment cabinet, the front closure means are at least substantially each designed as a pivotable flap. The pivoting may be performed, as required, in a vertical or horizontal direction. Here, for the sake of simplicity, it is particularly preferable if all of the front closure means are of similar form. This is however not imperatively necessary. Designing the front closure means as pivotable flaps permits simple unlocking and opening of the front closure means. Furthermore, flaps are extremely stable and durable, which is conducive to reliable utilization of the consignment cabinet. Alternatively or in addition, the front closure means may be at least substantially assigned to in each case exactly one consignment compartment. Then, access to particular consignments can be ensured very reliably without retrieving persons having access to other consignments.

The lateral closure means may all or at least predominantly be designed to be adjustable at least substantially in a direction perpendicular to the at least one row of consignment compartments between the closure position and the displacement position. In this way, the lateral closure means, in the displacement position, open up the lateral openings of the consignment compartments for the displacing-in of consignments, such that consignments can be displaced into the consignment compartments very reliably. This applies in particular for the case in which it is intended for a consignment to be displaced through one or more consignment compartments into a consignment compartment situated behind these. It is particularly expedient if the lateral closure means of at least substantially each consignment compartment of a row of consignment compartments are formed as a roller door. Roller doors can be adjusted very easily and reliably perpendicular to the row of consignment compartments, and furthermore open up the lateral openings fully, as required, for the displacing-in of consignments. Furthermore, in this way, it is possible to realize very large lateral openings if a roller door at least substantially forms a side wall of a consignment compartment.

If the consignment compartments are arranged in at least two rows, arranged one above the other, of consignment compartments arranged adjacent to one another, it is possible for a greater number of consignments to be received in the consignment cabinet. Furthermore, the introduction of consignments into the consignment compartments is then possible very easily. Here, at least in one case, two consignment compartments arranged one above the other may be assigned a common lateral closure means, which may be realized particularly easily if the lateral closure means are formed as a roller door. It is then merely necessary for the length of the roller door and the side walls of the consignment compartments arranged one above the other to be adapted. The corresponding use of roller doors can furthermore permit the use of a very large number of rows, arranged one above the other, of consignment compartments.

If the consignment compartments of a common row of consignment compartments arranged adjacent to one another are designed to be of equal height, equal width and/or equal depth, this makes it easier for consignments to be displaced into a consignment compartment or displaced through a consignment compartment. In simple terms, the consignment compartments may have an at least substantially equal size. In this case, a consignment which fits into one consignment compartment can be displaced without problems into an adjacent consignment compartment, or pushed through preceding consignment compartments. To be able to provide consignment compartments of different size, such that consignments of different size can also be received in space-saving fashion in consignment compartments suitable for them, it is preferably possible for the consignment compartments of different rows of consignment compartments arranged adjacent to one another to be designed to be of different height, different width and/or different depth. In other words, rows of consignment compartments of different size may be provided so as to be arranged one above the other, wherein the consignment compartments of one row are preferably each designed to be of equal size.

A consignment cabinet preferably has a control device for adjusting the lateral closure means from the closure position into the displacement position and back. The consignment cabinet can thus at all times adjust the position of the lateral closure means such that the respectively next desired loading step can be reliably performed, in particular by means of a delivery vehicle. The consignment cabinet may have a control device for detecting and/or storing a loading situation, such that it is always certain which consignment compartments are still available for further loading. If the control device does not store these pieces of information, they may preferably be continuously newly detected or transmitted to an external memory device for storage. Likewise, the consignment cabinet may have a transmitter device for transmitting a piece of information relating to a loading situation of the consignment cabinet and/or relating to the position of at least particular lateral closure means. The pieces of information may, for further use, be transmitted to an external control device and/or to the delivery vehicle, depending on what is intended to be performed on the basis of the pieces of information. Also, a receiver device for receiving control commands and/or pieces of information relating to the delivery of at least one consignment by means of a delivery vehicle in the consignment cabinet may be provided. This then serves for at least partial external control of the consignment cabinet and/or for the coordination of consignment cabinet and delivery vehicle.

An external control device is to be understood to mean a control device which is neither part of the consignment cabinet nor part of the delivery vehicle. For the sake of simplicity, it may involve a central processor unit, a server or the like. The external control device can then expediently control a very large number of different consignment cabinets and/or delivery vehicles.

What is furthermore particularly preferable is the joint use of the delivery vehicle and of the consignment cabinet in each case of the type mentioned in the introduction and described in more detail above as a system composed of a delivery vehicle and a consignment cabinet, wherein at least one lateral closure means of at least one consignment compartment is arranged in a displacement position in which it opens up a lateral opening, and wherein the at least one displacing device, in particular the at least one plunger unit, is arranged so as to engage at least in portions through the at least one opened-up lateral opening into at least one consignment compartment assigned to the opening.

This makes allowance for the fact that the described delivery vehicle is particularly suitable for the loading of a likewise described consignment cabinet and, at the same time, the described consignment cabinet itself is particularly suitable for being loaded by the described delivery vehicle. The preferred interaction of the delivery vehicle and the consignment cabinet arises here by virtue of the displacing device of the delivery vehicle engaging laterally into the consignment cabinet and, in so doing, engaging at least through a lateral opening of a consignment compartment in order to displace a consignment into said consignment compartment or into an adjacent consignment compartment. By means of the arrangement of the consignment compartments in at least one row adjacent to one another and the lateral closure means assigned to the consignment compartments, it is made possible for consignments to be laterally displaced into or through a consignment compartment by means of a simple and reliable displacing device. At the same time, however, a reliable separation of the consignment cabinets is achieved as required in order to prevent unauthorised persons from accessing consignments.

In a first particularly preferred refinement of the method, the delivery vehicle comes to a stop laterally adjacent to a particular one of at least two opposite sides of the consignment cabinet in a manner dependent on the distribution of the consignment compartments occupied with consignments. The specification of which of the opposite sides of the consignment cabinet the delivery vehicle comes to a stop at, and in particular also what orientation the delivery vehicle comes to a stop in, can be predefined by the at least one control device, specifically on the basis of the distribution of the consignment compartments occupied with consignments. Then, for the coming to a stop, that side of the consignment cabinet is selected from which, based on the actual occupancy of the consignment cabinet with consignments, a greater number of consignments can be handed over to the consignment cabinet without multiple consignments undesirably passing into one and the same consignment compartment. It is thus possible, as required, for a greater number of consignments to be handed over from the delivery vehicle to the consignment cabinet than from the other side of the consignment cabinet.

Alternatively or in addition, the number of consignments to be handed over to the consignment cabinet may be increased by virtue of the delivery vehicle, after the handover of at least one consignment to the consignment cabinet from one side of the consignment cabinet, driving to the opposite side of the consignment cabinet and coming to a stop there laterally adjacent to the consignment cabinet, specifically preferably in a reversed direction, such that in each case the same side of the delivery vehicle points towards the consignment cabinet. Subsequently, a handover of at least one consignment into the consignment cabinet is performed from this side of the consignment cabinet also. Here, the control device activates at least one lateral closure means assigned to at least one consignment compartment, specifically if the delivery vehicle is situated at the opposite side of the consignment cabinet. The activation of the closure means is then in turn performed in a manner dependent on the distribution of the consignment cabinets occupied with consignments and in order to adjust the closure means from a closure position, in which it closes off a lateral opening of the at least one consignment compartment, into a displacement position, in which it opens up the lateral opening. Furthermore, the control device of the delivery vehicle activates the at least one displacing device in order to displace a consignment into a consignment compartment with opened lateral opening. By means of the delivery of consignments to the consignment cabinet from opposite sides, the capacity of the consignment cabinet can be better utilized. Furthermore, the increasing fragmentation of the consignment compartments occupied with consignments within the consignment cabinet can be counteracted.

Alternatively or in addition, by means of at least one detecting device for detecting the completion of the displacement of a consignment into a consignment compartment, a piece of information associated with the completion of the displacement of the consignment into the consignment compartment can be transmitted to a control device, in particular of the delivery vehicle and/or of the consignment cabinet. In this way, it is achieved that the loading situation is documented. In particular, it is thus possible to track which consignment is stored in which consignment compartment. It can thus also be detected when the displacement of a consignment into a consignment compartment has been concluded, such that, for example, the displacing device can be adjusted back into the retracted position in order to deliver a further consignment. It is however thus also possible for the adjustment of at least one lateral closure means into the closure position to be caused, in order to conclude the loading of the consignment compartment or enable a further consignment to be displaced into an adjacent consignment compartment. It will be preferable if the control device for receiving the information relating to the completion of the loading of a consignment compartment is arranged in the consignment cabinet. It is thus possible for the corresponding pieces of information to be stored, and conclusions to be drawn, on-site. It is however also conceivable for the control device to alternatively or additionally be provided in the delivery vehicle in order to be able to control the delivery of the consignments into the consignment cabinet. The control commands may however also be generated by the consignment cabinet or by an external control device, which can supply pieces of control information to the delivery vehicle and to the consignment cabinet as required. The pieces of control information may for example be transmitted via a local radio network or a mobile radio network, for example Bluetooth or Wireless Local Area Network (WLAN) and/or a mobile radio network, in particular Global System for Mobile Communication (GSM), Universal Mobile Telecommunications System (UMTS) and/or Long Term Evolution (LTE).

A control device of the consignment cabinet may alternatively or additionally detect which consignment compartments are occupied with consignments and/or which consignment compartments do not have consignments. Thus, the present loading situation is always known, and the loading situation can be utilized for control of the loading of the consignment cabinet with consignments and/or for the issue of consignments to a retrieving person.

Here, it is furthermore preferable if the control device of the consignment cabinet transmits a piece of information relating to at least one consignment compartment with opened lateral opening for the transfer of a consignment from the delivery vehicle and/or a piece of information relating to the occupancy of consignment compartments with consignments. Corresponding pieces of information can be utilized by the delivery vehicle in order to hand over the next consignment in targeted fashion, and in the respectively desired manner, to the consignment compartment. In this case, too, the transmission of the piece of information from the consignment cabinet to the delivery vehicle is particularly simple and advantageous. In order to nevertheless be able to externally intervene in the loading or externally control the loading, it may likewise be expedient for the corresponding item of information to be transmitted to an external control unit, which may then in turn be connected to the consignment cabinet and/or to the delivery vehicle for control purposes.

For the handover of a consignment to a consignment cabinet, it is possible firstly for a ramp of the delivery vehicle to be adjusted from a non-use position into a use position. Then, the at least one consignment to be handed over can be issued from a consignment store via a handover device to the ramp situated in the use position. This makes it possible for the consignment to be handed over to be displaced by means of the displacing device and the ramp into a consignment compartment of the consignment cabinet. Here, the ramp ensures that the consignment to be handed over passes reliably from the delivery vehicle into the consignment cabinet, and, as required, bridges at least the distance between the delivery vehicle and the consignment cabinet.

If the displacing device, the plunger unit and/or the ramp is adjusted in height, the displacing device, the plunger unit and/or the ramp can be adapted to the respective height level of a consignment compartment or of a row of consignment compartments, arranged adjacent to one another, of a consignment cabinet, such that a consignment can be reliably handed over from the delivery vehicle to the corresponding consignment compartment. Here, the height adjustment is preferably controlled by a control device which may, but need not imperatively, be situated in the delivery vehicle. The control unit may also be provided in the consignment cabinet or externally and control the height adjustment by radio, for example. The pieces of control information may for example be transmitted via a local radio network or a mobile radio network, for example Bluetooth or Wireless Local Area Network (WLAN) and/or a mobile radio network, in particular Global System for Mobile Communication (GSM), Universal Mobile Telecommunications System (UMTS) and/or Long Term Evolution (LTE).

If a control device, in particular of the consignment cabinet, detects the removal of a consignment from at least one consignment compartment, it is possible to track which consignment compartments have been emptied, in order for these to be repopulated with consignments, for example by means of the delivery vehicle. It is thus not necessary for the consignment cabinet to be completely emptied in order for new consignments to be introduced into the consignment cabinet. To identify that a consignment compartment is being or has been emptied, it is for example possible to detect an item of information relating to the command for opening and/or relating to the adjustment of a front closure means assigned to the consignment compartment into the removal position. Then, it must be assumed that the consignment is also removed from an opened consignment compartment. To ensure this, it is alternatively or additionally possible for at least one sensor device to be provided in the consignment cabinet, which sensor device can directly detect a consignment in a consignment compartment or, in the inverse case, the empty state of a consignment compartment. In both cases, it is possible to make a reliable decision as regards whether a particular consignment compartment is actually empty or occupied with a consignment.

The control device, in particular of the consignment cabinet, may alternatively or additionally activate at least two lateral closure means to both sides of a consignment compartment which has a consignment for the purposes of adjusting from the closure position into the displacement position. This activation ultimately causes the opening of at least one consignment compartment to both sides. Specifically, oppositely situated lateral closure means of a consignment compartment are adjusted into the displacement position, in which the associated opening is opened up. A consignment compartment opened at both sides can now be advantageously utilized for the displacement of a consignment through the consignment compartment. Here, the consignment then passes through one lateral opening of said consignment compartment into a laterally adjacent further consignment compartment. The consignment can then remain in said further consignment compartment until it is retrieved. The consignment may however be displaced through said consignment compartment also. The displacement of the consignment is performed here in addition preferably by means of the displacing device, in particular the plunger unit, of the delivery vehicle.

The consignment compartment can be loaded with new consignments in a particularly effective manner if a multiplicity of consignments in succession is handed over by means of the displacing device of the delivery vehicle to a corresponding multiplicity of consignment compartments arranged adjacent to one another in a row. This makes it necessary merely for the consignment compartments arranged adjacent to one another to be empty. If this is not the case, a consignment can be displaced from one consignment compartment through a lateral opening into an adjacent consignment compartment in order to make space for new consignments. Here, the displacement of a consignment that is already present is not restricted to the displacement from one consignment compartment into the next consignment compartment. By means of the adjustment of multiple lateral closure means arranged in succession into the displacement position, the consignment that is already stored in the consignment cabinet may even be displaced through further consignment compartments, at most until the consignment has reached the final consignment compartment of the corresponding row of consignment compartments or has reached the final free consignment compartment. In the latter alternative, a further displacement of the consignment should be avoided if it is sought to prevent two consignments from being arranged in one and the same consignment compartment after the displacement, but are not intended to be retrieved by one and the same retrieving person. This principle also applies correspondingly to consignments to be newly displaced into the consignment cabinet. These, too, can normally be displaced into the consignment cabinet only until the final consignment compartment of a row of consignment compartments has been reached. Furthermore, in the case of these consignments, too, a situation should be prevented in which the consignments are received with other consignments in one and the same consignment compartment, wherein the consignments are not intended for being retrieved by the same person.

To control the loading of a consignment cabinet by a delivery vehicle, the control device of the delivery vehicle may transmit a piece of information relating to the assignment of the handed-over consignments to the consignment compartments receiving the consignments being handed over. In this way, tracking is performed as regards which consignment is available in which consignment cabinet for retrieval, such that a retrieving person can reliably receive the consignment held for retrieval by that person. Here, for the sake of simplicity, it is preferable for said piece of information to be transmitted to a control device of the consignment cabinet. The piece of information may however basically also be transmitted to a control device which is provided neither in the delivery vehicle nor in the consignment cabinet. Said control device may then be connected to a control device of the delivery vehicle or of the consignment cabinet by radio, for example. The pieces of control information may for example be transmitted via a local radio network or a mobile radio network, for example Bluetooth or Wireless Local Area Network (WLAN) and/or a mobile radio network, in particular Global System for Mobile Communication (GSM), Universal Mobile Telecommunications System (UMTS) and/or Long Term Evolution (LTE).

BRIEF DESCRIPTION OF THE DRAWINGS

The invention will be discussed in more detail below on the basis of a drawing, which illustrates merely exemplary embodiments. In the drawing:

FIGS. 4A-B show the consignment cabinet in a state for receiving consignments in a schematic illustration in a view from the side and a view from the front.

DETAILED DESCRIPTION

Figure 1A:
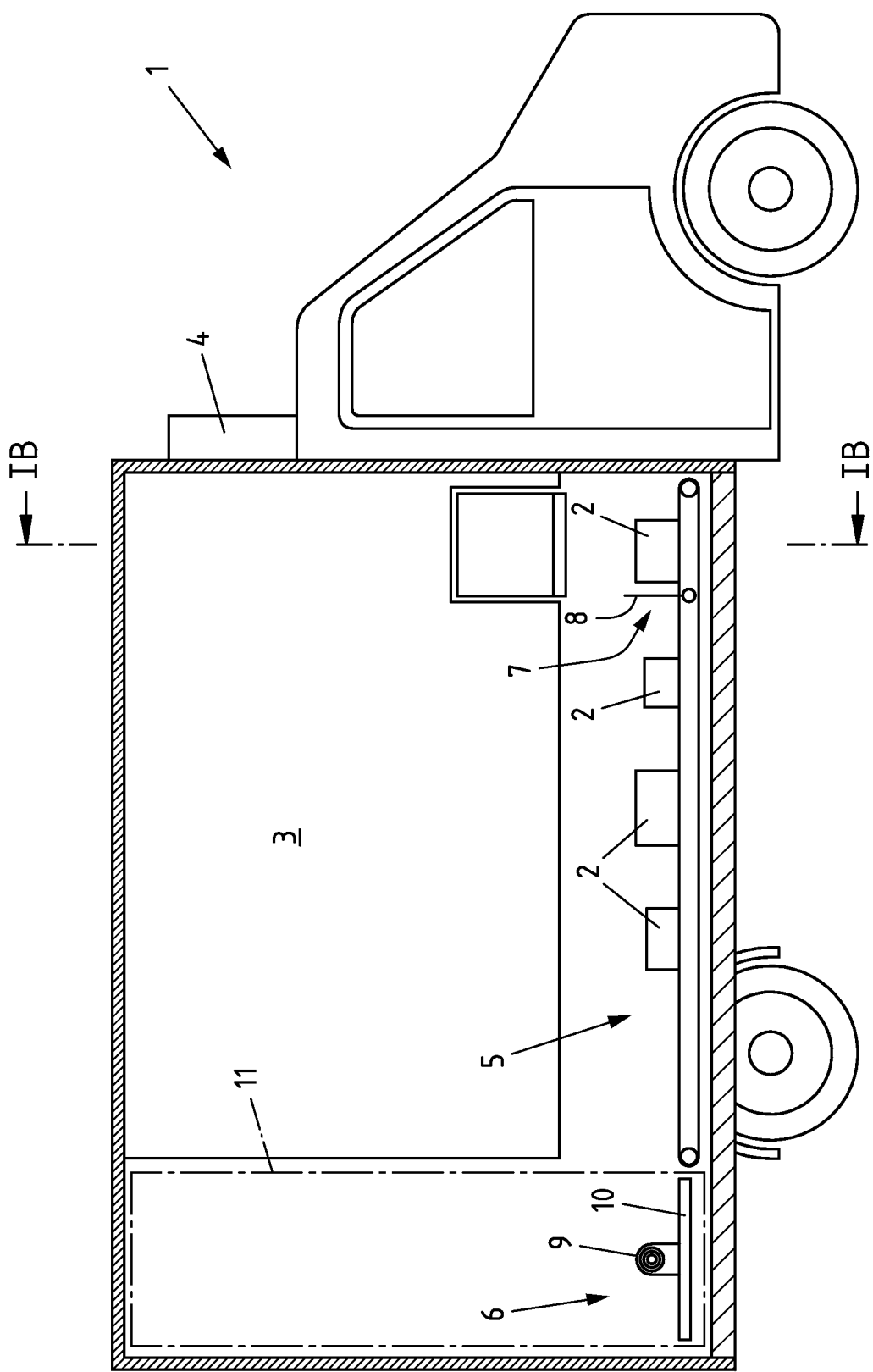
FIGS. 1A-B show a delivery vehicle according to the invention in a state for traveling in a schematic illustration in a view from the side and a view from the front.
Figure 1B:
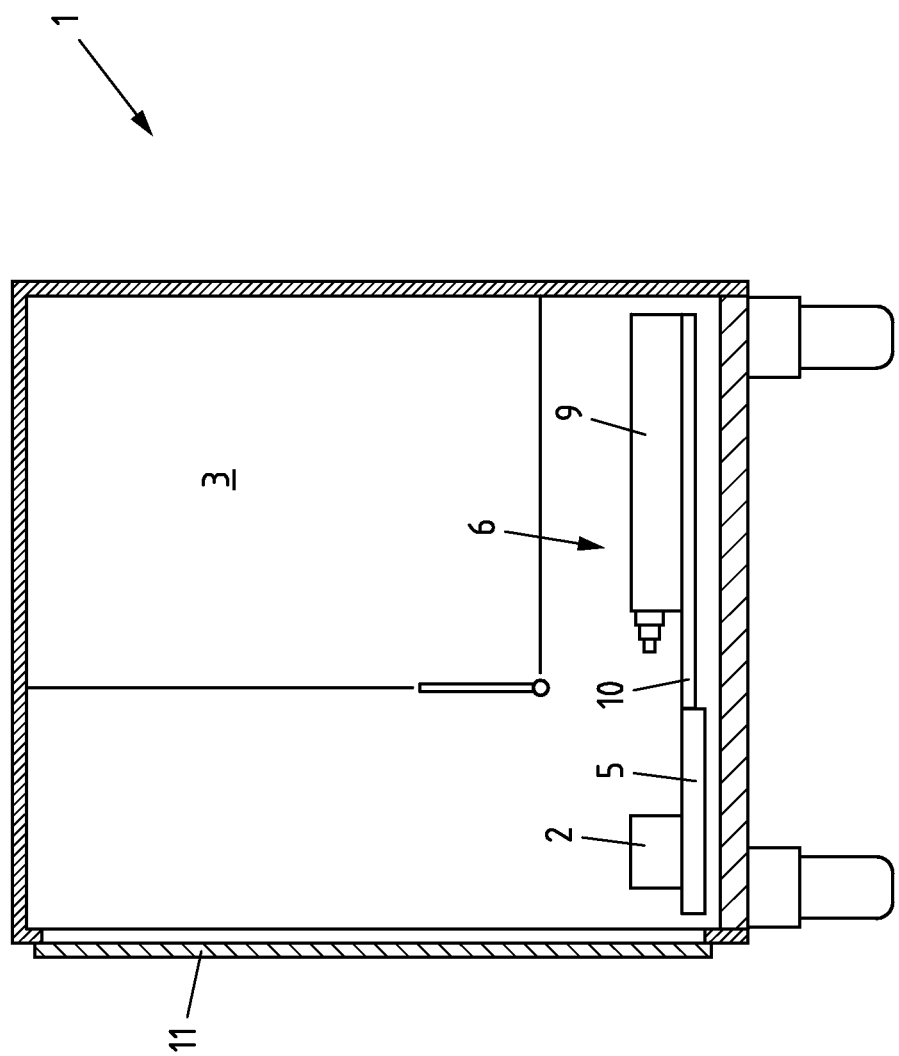

FIGS. 1A-B illustrate a delivery vehicle 1 in a side view and in a front view, wherein the walls of the delivery vehicle 1 are schematically of transparent form. The illustrated and thus preferred delivery vehicle 1 has a driver's cab even though the delivery vehicle 1 is an autonomous delivery vehicle 1. In this context, autonomous means that the delivery vehicle 1 can drive autonomously and independently from a loading location, for example a distribution station for consignments 2, at which the delivery vehicle 1 is loaded with consignments 2 to be delivered, to at least one delivery location without the need for intervention by a driver. The driver can in certain situations intervene and control or steer the delivery vehicle 1. The driver may however also drive the delivery vehicle 1 entirely independently. The delivery vehicle 1 may basically also be designed without a driver's cab if no driver is required.

Furthermore, the illustrated and thus preferred delivery vehicle 1 is however also autonomous in the sense that the delivery of consignments 2 can be caused by the delivery vehicle 1 itself. In this respect, the delivery vehicle 1 likewise acts independently without the need for intervention by an operator, for example the driver. Here, too, provision may however basically be made for a person to intervene in or control the delivery, wherein the control may then be performed on-site or from a distance, in the context of remote control. For this purpose, it is for example possible for control signals to be transmitted to the delivery vehicle from an external control device via a local radio network or a mobile radio network, for example Bluetooth or Wireless Local Area Network (WLAN) and/or a mobile radio network, in particular Global System for Mobile Communication (GSM), Universal Mobile Telecommunications System (UMTS) and/or Long Term Evolution (LTE). For the autonomous driving, the delivery vehicle 1 may use at least one satellite navigation system, for example the Global Positioning System (GPS), the GLONASS system, the Galileo system, the Beidou system, the Indian Regional Navigation Satellite System or the Quasi-Zenith Satellite System.

A major part of the delivery vehicle 1 is formed by a consignment store 3 in order to be able to carry the greatest possible number of consignments 2 on board and deliver these at the corresponding delivery location. Here, use may basically be made of a variety of types of consignment stores 3, for which reason the type of consignment store 3 present here is not specified in any more detail. In a particularly simple case, the consignment store 3 is loaded with consignments 2 in the sequence corresponding to the sequence, or the reversed sequence, of the delivery of the consignments 2. There is then no need for any further sorting in the consignment store 3, and the unloading process is simplified. The consignments 2 can simply be output one by one in series by means of a conveying device. Here, the conveying device is preferably driven electrically and by means of a control device 4 of the delivery vehicle 1. Provision may however also be made for the consignments 2 to be output in the desired sequence, which does not have to be certain at the time of loading of the delivery vehicle 1, by a robot arm or a portal robot, which can move at least in two spatial directions perpendicular to one another. The robot arm or the portal robot can then in each case grip the desired consignment 2 and move it out of the consignment store 3. Other means are however conceivable. The exact design of the consignment store 3 is in the present case basically of relatively minor importance.

The consignments 2 originating from the consignment store 3 are transferred by a handover device 5 to a displacing device 6. It would however basically also be conceivable for the consignments 2 output from the consignment store 3 to be supplied to the displacing device directly and not via a separate handover device 5. The illustrated handover device 5 is designed as a conveyor belt, though this is not imperatively necessary. It would basically also be possible for use to be made of passive handover devices such as slides or the like, or else other active, that is to say driven, handover devices known from the prior art which are suitable for supplying the consignments 2 from the consignment store 3 to the displacing device 6. The illustrated and thus preferred handover device 5 in the form of a conveyor belt furthermore also comprises a separating device 7 in order to make it possible for the consignments 2 to be delivered, or supplied to the separating device 7, in a manner reliably separated from one another. Said separating device 7 could, as required, be in the form of an additional conveyor belt which can transfer the consignments 2 individually in succession and/or accelerate said consignments in order to thus realize a spatial separation between successive consignments 2. Other separating devices are however also possible. In the present case, a separating blade 8 which is adjustable from a non-use position into a use position in contact with at least one consignment 2 and back is provided. When said separating blade is adjusted into the use position, it comes into contact with the consignment 2 situated in front of it, and holds said consignment by way of a form fit. If the separating blade 8 is adjusted into the non-use position, for example is pivoted upward, the path is cleared for the consignment 2 that had previously been stopped by the separating blade 8.

In the illustrated and thus preferred delivery vehicle 1, the displacing device 6 has a plunger unit 9 and a ramp 10. The plunger unit 9 is in this case designed such that it can push a consignment 2 situated in front of the plunger unit 9 and resting on the ramp 10 situated in the use position away, and thus displace said consignment, along the ramp 10. During this, the consignment 2 is supported or guided at least in portions by the ramp 10. In the illustrated non-use position of the ramp 10, the latter is arranged such that the ramp 10 does not impede the movement of the delivery vehicle 1. In the present case, the ramp 10 is retracted, though this is not imperative. In the use position, the ramp 10 is preferably arranged, when the delivery vehicle 1 is at a standstill, for the delivery of consignments 2. To be able to deliver the consignments 2 in each case at the desired height, it is the case in the illustrated and thus preferred delivery vehicle 1 that the displacing device 6 or the plunger unit 9 and the ramp 10 are of height-adjustable design. Furthermore, the handover device 5 is of height-adjustable design in order to make it possible for the consignments 2 to be supplied to the displacing device 6 already at the correct height. Although this is not imperative, it eliminates the need for repeated adjustment of the displacing device 6 and expedites the delivery of the consignments 2. For the displacement of the consignments 2 to the outside, a sliding door 11 is provided.

Figure 2A:
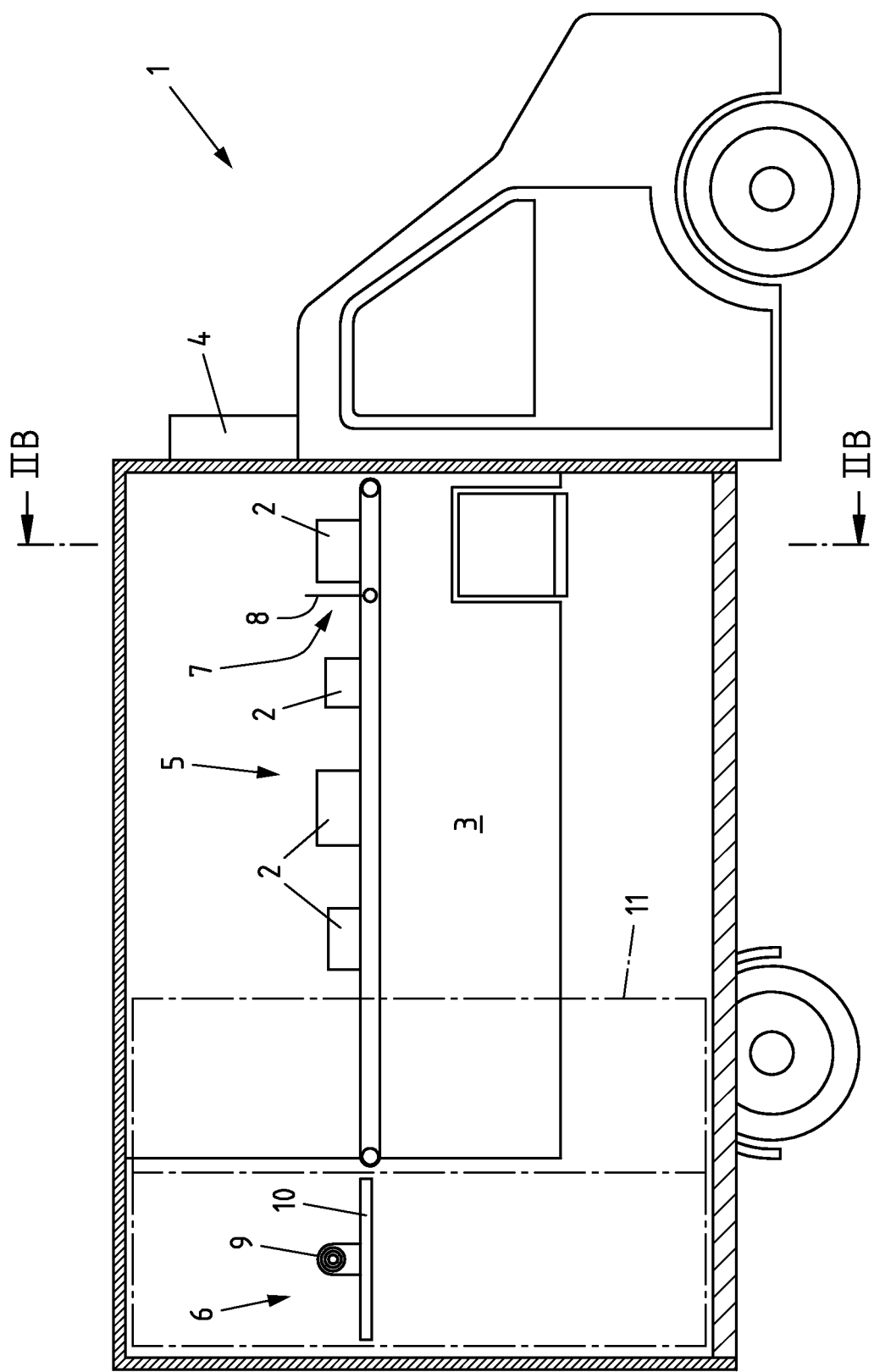
FIGS. 2A-B show the delivery vehicle from FIG. 1 in a state for delivering consignments in a schematic illustration in a view from the side and a view from the front.
Figure 2B:
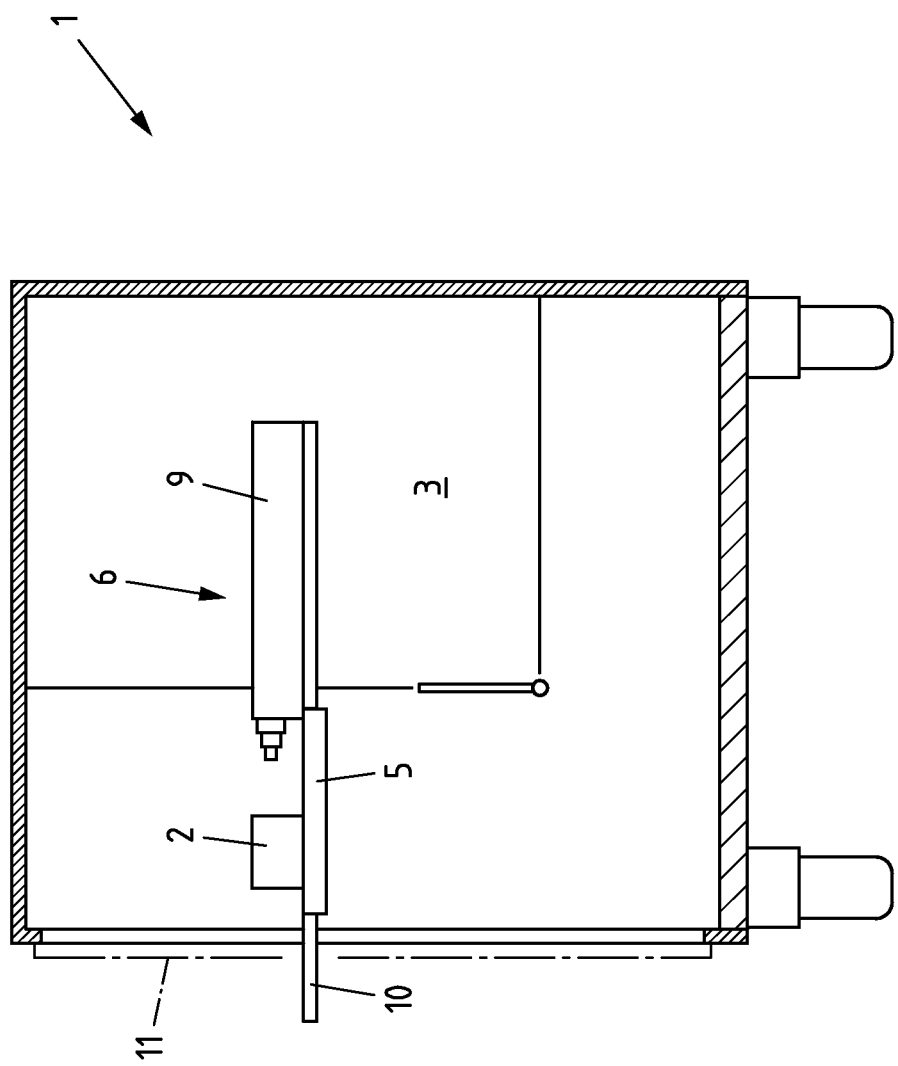

FIGS. 2A-B illustrate the same delivery vehicle 1 as illustrated in FIGS. 1A-B, but in a state which does not serve for the movement of the delivery vehicle 1 but which serves for the delivery of consignments 2 while the delivery vehicle 1 is at a standstill. The ramp 10 is therefore situated in a use position, in which the ramp 10 projects out of the delivery vehicle 1 from the sliding door 11 in order to be able to deliver a consignment 2 outside the delivery vehicle 1. The ramp 10 is in this case oriented in an at least substantially horizontal orientation and has been displaced out of the delivery vehicle 1 in this direction. The ramp 10 still projects with one end into the delivery vehicle 1 and, there, can receive a consignment 2 from the handover device 5. With the other end, the ramp 10 projects outward relative to the delivery vehicle 1. It would also be possible, as required, for the ramp 10 in the use position to be arranged entirely outside the delivery vehicle 1 and/or for pivoting between the use position and the non-use position, though this will generally not be preferred. When a consignment 2 is lying on the ramp 10, the plunger of the plunger unit 9 of the displacing unit 6 can be extended from a retracted position of the plunger unit 9 into a deployed position of the plunger unit 9 and the consignment 2 can thus be displaced out of the delivery vehicle 1 along the ramp 10. Before this occurs, the displacing device 6 and the handover device 5 can firstly be adjusted in height such that the displacing device 6 and the handover device 5 are arranged at the correct height to deliver the consignment 2 at the correct or desired height.

Figure 3B:
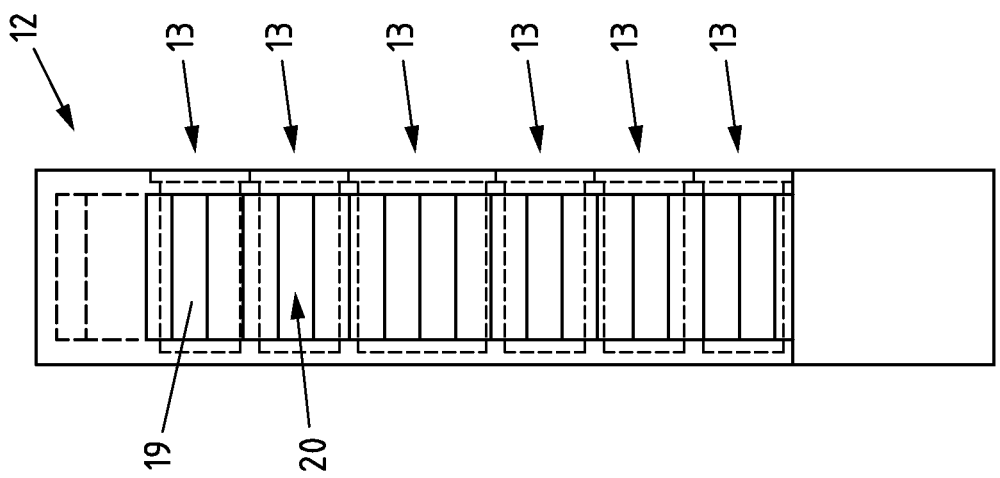
FIGS. 3A-B show a consignment cabinet according to the invention in a state for the retrieval of consignments in a schematic illustration in a view from the side and a view from the front.
Figure 3A:
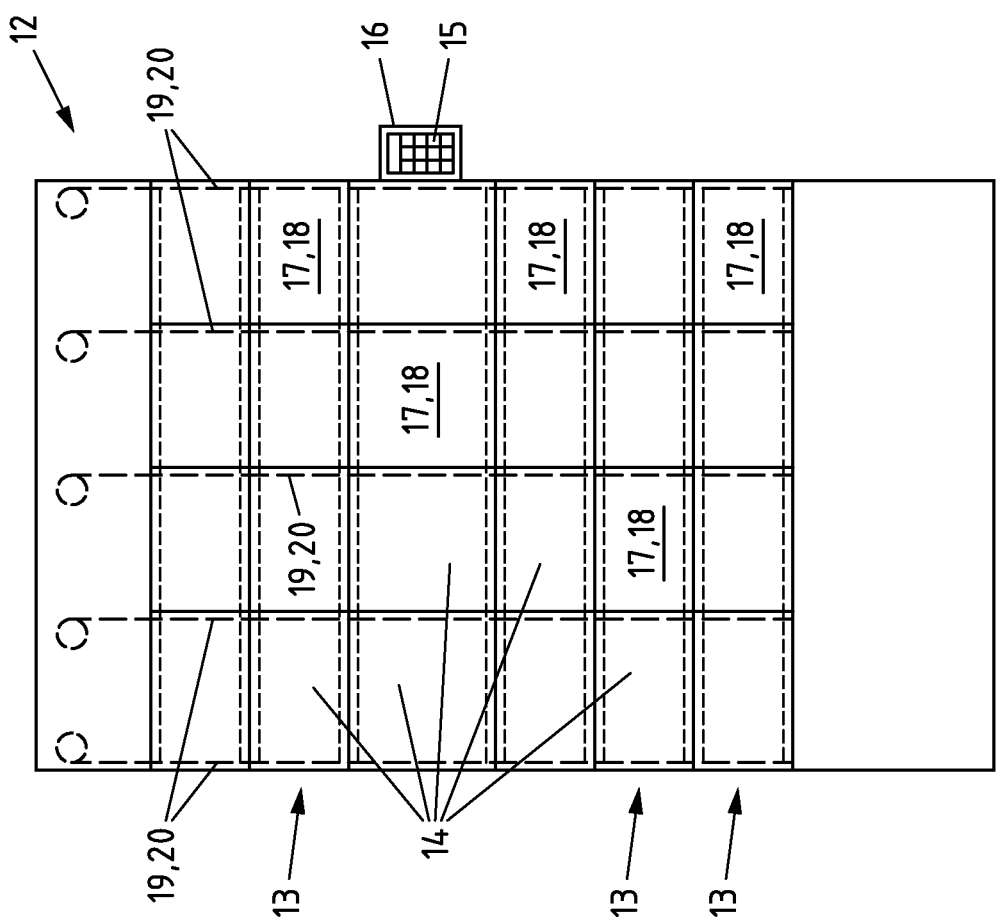

FIGS. 3A-B illustrate a consignment cabinet 12 for receiving and releasing consignments 2. The consignment cabinet 12 has multiple rows 13 of consignment compartments 14 arranged adjacent to one another, which can be separated from one another. The rows 13 of consignment compartments 14 are furthermore arranged one above the other, preferably in alignment one above the other. In each case one consignment 2 or multiple consignments 2 can be received in the individual consignment compartments 14. When said consignments have been deposited, it is preferable for the addressee or a retrieving person to receive a notification of the deposition of the consignment 2 and a code with which the addressee or retrieving person can authenticate themselves at the consignment cabinet 12. For example, the retrieving person inputs the code using an operator control panel 15 or transmits the code for example via a local radio network or a mobile radio network, for example Bluetooth or Wireless Local Area Network (WLAN) and/or a mobile radio network, in particular Global System for Mobile Communication (GSM), Universal Mobile Telecommunications System (UMTS) and/or Long Term Evolution (LTE), to a control device 16 in the consignment cabinet 12 or some other control device.

A control command is then generated in order to open the consignment compartment 14 associated with the code, such that the retrieving person can remove the desired consignment 2 from the consignment compartment 14. For the opening of the consignment compartment 14 and for the removal of the consignments 2, each consignment compartment 14 has a front opening 17, which is assigned a front closure means 18. The front closure means 18 can be adjusted from a closed position, in which it closes the front opening 17, into a position in which it opens up the front opening 17 for the removal of the consignment 2. This may be realized by means of an electric drive or by hand. It is particularly expedient, in particular if no electric drive is provided, for each front closure means 18 to be assigned a locking means, in particular a lock for locking and unlocking the front locking means. In order that, for the retrieval of a particular consignment 2, the front closure means 18 which closes off the associated consignment compartment 14, and only said front closure means, can be opened in targeted fashion, an electrically operated locking system is particularly expedient.

The individual consignment compartments 14 of the consignment cabinet 12 are separated from one another by lateral closure means 19. The lateral closure means 19 are in this case adjustable from a closure position, in which they close off lateral openings 20 of the consignment compartments 14, into a displacement position, in which they open up lateral opening 20 of the consignment compartments 14, which positions are illustrated in FIGS. 4A-B. In the displacement position, there is consequently a direct connection between at least two consignment compartments 14, via which connection consignments 2 can be displaced from one consignment compartment 14 into the adjacent consignment compartment 14. For the sake of simplicity, in the case of the illustrated and thus preferred consignment cabinet 12, each column of consignment compartments 14 is assigned in each case one common lateral closure means 19. This is also the reason why, in illustrated and thus preferred consignment cabinets 12, the consignment compartments 14 have the same width and the same height, in any case in a common column. It is however also preferable for the consignment compartments 14 of in each case one common row of consignment compartments 14 or line of consignment compartments 14 to have the same depth. Then, consignments 2 can be displaced through opened-up lateral openings from one consignment compartment 14 into an adjacent consignment compartment 14 without the consignment 2 becoming blocked in a consignment compartment 14. To be able to utilize the space effectively even in the case of consignments 2 of different size, it is however preferable for the consignment compartments 14 in different rows of consignment compartments 14 to be designed to be of different height.

The lateral closure means 19 illustrated at the far left and at the far right opens every row of consignment compartments 14 to the outside, such that the consignment compartments 14 can be loaded or populated with new consignments 2 without the need to adjust the front closure means 18 into the removal position. For this purpose, the consignments 2 merely have to be displaced into the consignment cabinet 12 from the side until the consignments 2 have reached the desired consignment compartment for receiving the consignment 2. The filling of the consignment cabinet 12 from the side may be performed, as required, by an operator, for example a targeted-delivery person for the consignments 2. Here, it is merely necessary to be certain of, or for information to be transmitted with regard to, which consignments 2 are situated in which consignment compartment 14 after the loading of the consignment cabinet 12, in order that, in the event of a later request by a retrieving person, the consignment cabinet 12 always unlocks, and/or adjusts into the removal position, the front closure means 18 assigned to the consignment compartment 14 in which the consignment 2 respectively to be retrieved is situated.

Figure 5:
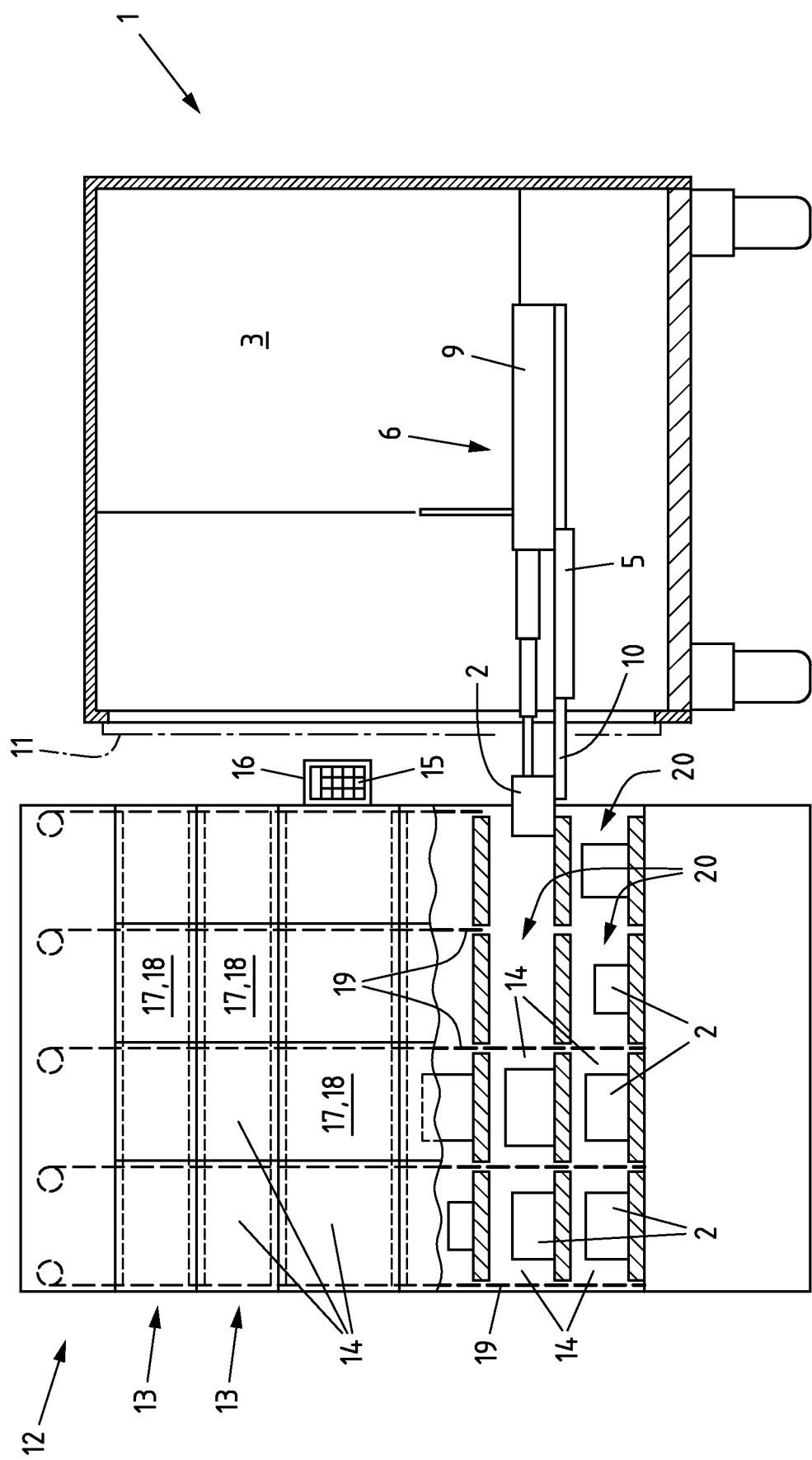
FIG. 5 shows a system composed of delivery vehicle and consignment cabinet for the delivery of consignments.

As illustrated in FIG. 5, the loading of the consignment cabinet 12 may however also be performed easily and reliably by a delivery vehicle 1 of the described type. Here, the consignment store 12 hands over one or more consignments 2 to the handover device 5, which then gradually, that is to say individually and separately, hands over said consignments 2 to the ramp 10, along which the plunger unit 9 of the displacing device 6 displaces the consignment into the consignment cabinet 12. For this purpose, the telescopable plunger unit 9 correspondingly extends and, in so doing, correspondingly pushes the consignment 2 in front of it. The plunger unit 9 can, by corresponding extension, however not only displace the consignment 2 into the consignment cabinet 12 but also be displaced in the consignment cabinet 12. For the latter, the ramp 10 is not imperatively required, which ramp consequently does not need to be extendable to such a great extent if, during the corresponding displacement, the consignments 2 slide along the bases of the consignment compartments 14.

By virtue of the fact that, during the handover of each consignment 2, the plunger unit 9 is extended by a certain predefined distance, it is ensured that the consignment 2 passes in each case into the desired consignment compartment 14, or it is possible to detect which consignment 2 has passed into which consignment compartment 14. By virtue of the displacing device 6, the ramp 10 and the plunger unit 9 being arranged in height-adjustable fashion in the delivery vehicle 1, it is ensured that the consignments 2 are handed over to the consignment cabinet 12 at a suitable or the desired height. Here, the height is predefined, and/or the delivery vehicle 1 detects the consignment cabinet 12 by means of at least one sensor in order to adapt the height of the ramp 10 and the plunger unit 9 to the height of the lateral opening 20, opened up by a lateral closure means 19, of a consignment compartment 14, which can be identified by the sensor.

In order that the displacing device 6, or the ramp 10, and/or the handover device 5 do not need to be adjusted in height excessively often, it is possible for firstly the consignments 2 that are to be handed over to a row 13 of consignment compartments 14 on a common level to be handed over firstly from the consignment store 12 to the handover device 5. Then, the handover device 5 together with the displacing device 6 can be adjusted in height, and the displacing device 6 can then, at the corresponding height level, displace all of the consignments 2 from the handover device 5 into the consignment cabinet 12 in succession. When all consignments 2 have been handed over to the consignment cabinet 12, the delivery vehicle 1 moves away, and the lateral closure means 19 close until they have reached the closure position again.

Exemplary steps during the delivery of consignments 2 by a delivery vehicle 1 into a consignment cabinet 12 are illustrated in FIG. 6. Accordingly, as illustrated in FIG. 6A, it is firstly possible, in the case of a partially empty or partially emptied consignment cabinet 12, for lateral closure means 19 to firstly be at least partially opened. Subsequently, the displacing device 6 is raised to a height level of a row 13 of consignment compartments 14 in which a consignment 2 is already situated, specifically in a consignment compartment 14 whose adjacent consignment compartment 14 on the side averted from the delivery vehicle 1 has no consignment 2. To be able to receive the greatest possible number of consignments 2, the displacing device 6 is, after the adaptation of the height level, extended to such an extent that the displacing device 6 displaces the consignment 2 into the adjacent consignment compartment 12. The consignment 2 may in this case preferably be displaced into the final consignment compartment 14 of the corresponding row 13 of consignment compartments 14. Alternatively, the consignment 2 may be displaced into the final empty consignment compartment 14 in the displacing direction 6, specifically proceeding from the consignment compartment 14 in which the consignment 2 was originally situated, as illustrated in FIG. 6B. The number of consignment compartments 14 by which the consignment 2 is displaced here is in this case of lesser significance. In this way, a situation is prevented in which two consignments 2 inadvertently pass into one consignment compartment 14 or two consignments 2 that are intended for retrieval by different persons pass into one consignment compartment 14. Furthermore, for this reason, the lateral opening 2, toward the consignment compartment 14 that is already occupied has also been closed off by a lateral closure means 19.

Figure 6A:
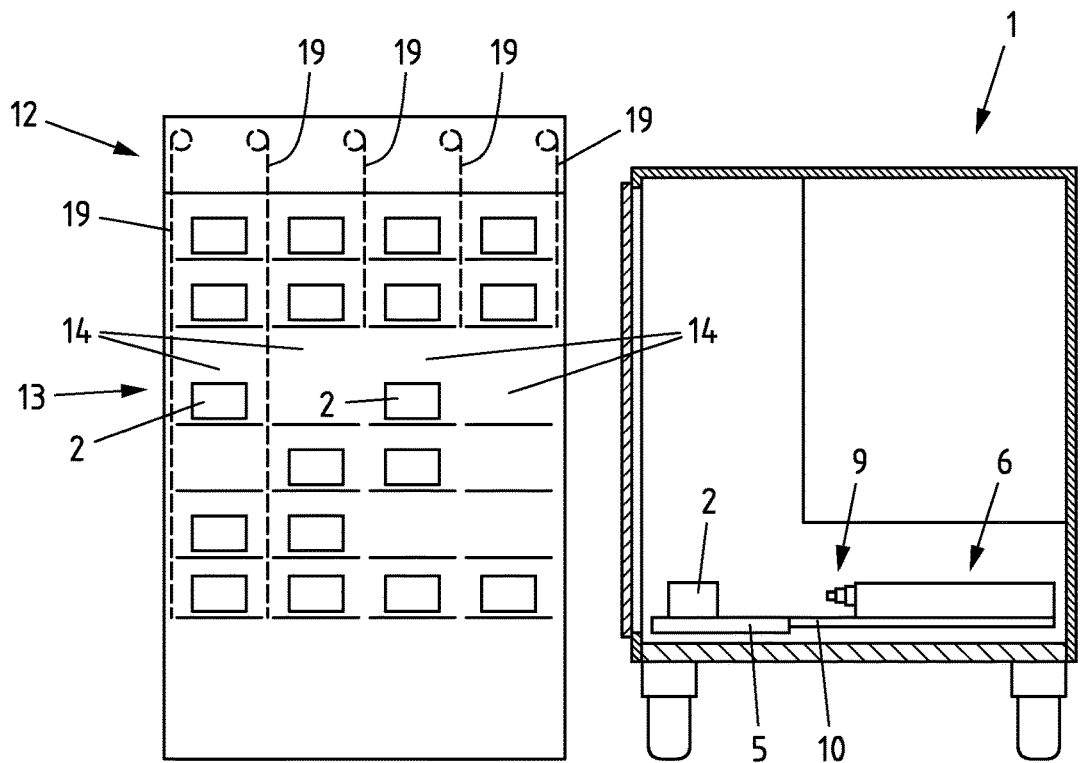
FIGS. 6A-E show method steps of a method according to the invention in a schematic illustration.
Figure 6B:
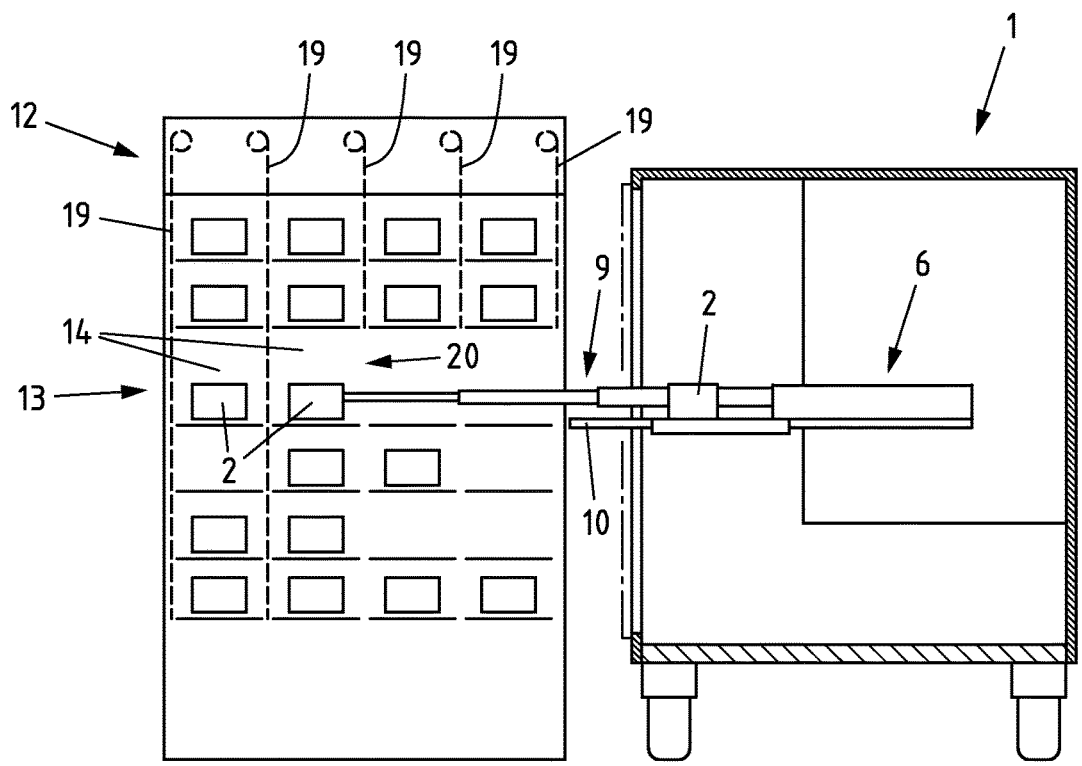
Figure 6C:
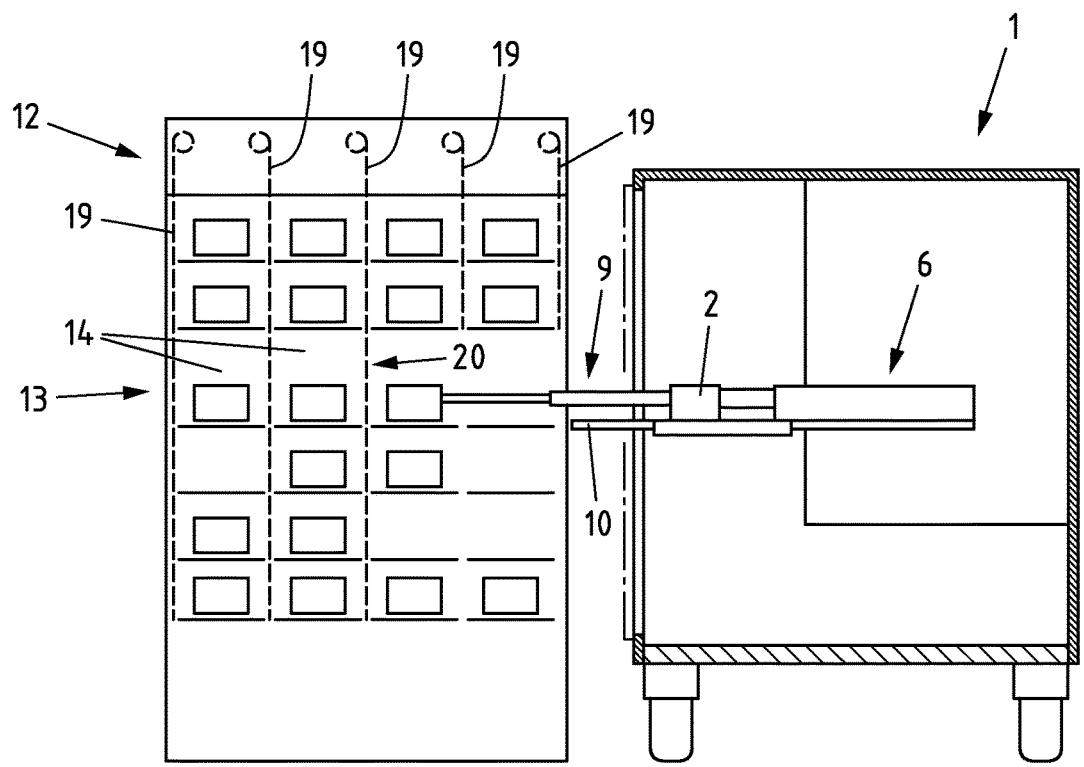

Then, or already before this, a number of consignments 2 that is intended to or can be issued at this height level into the row 13 of consignment compartments 14 can be removed from the consignment store 12. Some other number of consignments 2 may however likewise be removed, specifically, as required, even at a different point in time. The consignments 2, which have, as required, already been separated from one another by means of the separating device 7, are then handed over in succession to the ramp 10 of the separating device 7 and handed over by the plunger unit 9, by adjustment into a deployed position, mutually adjacently into those consignment compartments 14 of the corresponding row 13 of consignment compartments 14 which are still free. After the handover of each individual consignment 2, the lateral closure means 19, facing toward the delivery vehicle 1, of the consignment compartment 14 most recently occupied with a consignment 2 is adjusted as required into a closure position which closes off the associated lateral opening 20. A situation is thus avoided in which a consignment 2 is inadvertently displaced too far into the consignment cabinet 12. This is illustrated in FIG. 6C.

Figure 6D:
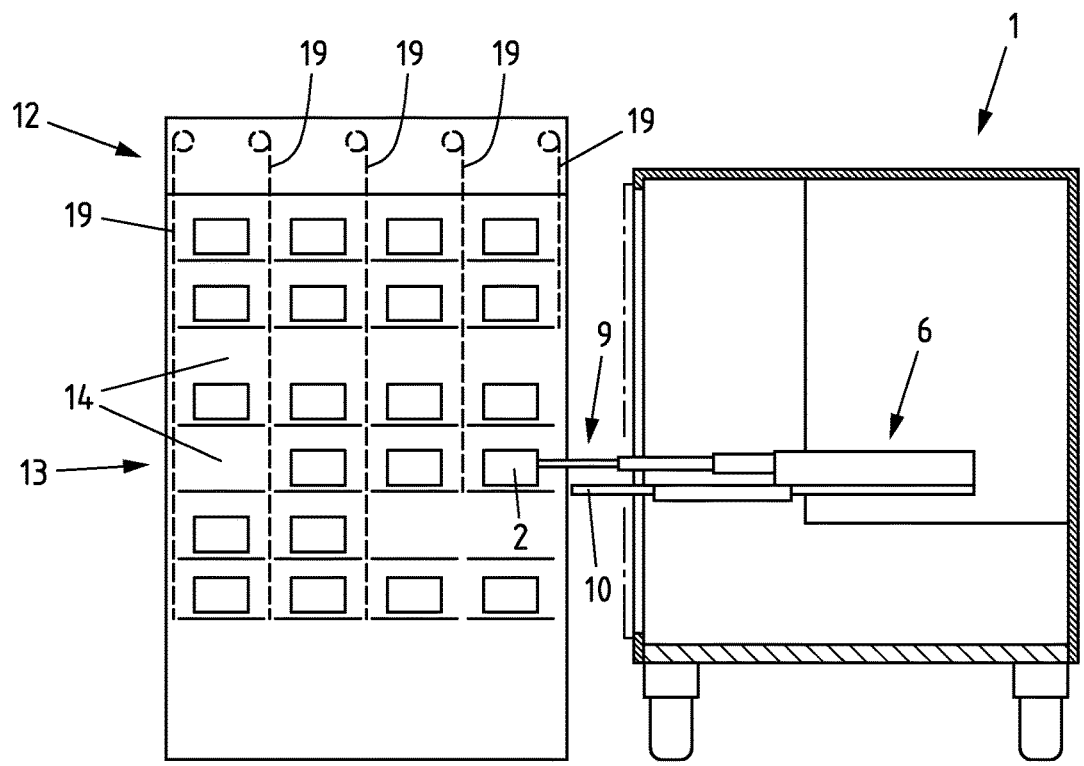
Figure 6E:
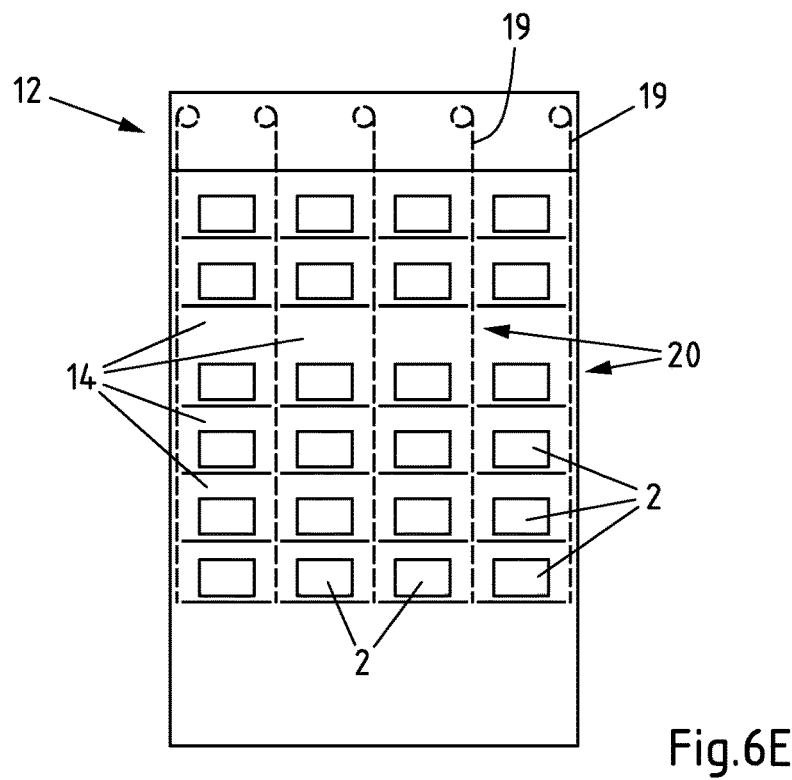

In a next step, the displacing device 6 together with the handover device 6 can be lowered to the height level of the row 13 of consignment compartments 14 situated therebelow. This is performed, as required, together with the handover device 6 if this still has consignments 2, or new consignments 2 are issued from the consignment store 3 to the handover device 5 for the first time, for which purpose the handover device 5 must, as required, firstly be adjusted further downward and subsequently raised again to the new level of the displacing device 6. There, a displacement of consignments 2 that were already present is not performed if the two consignments 2 provided there are still intended to remain in separate consignment compartments 14. Thus, only one further consignment 2 is handed over, as illustrated in FIG. 6D. To be able to fill the consignment compartment 14 that is then still empty, it would be possible for the delivery vehicle 1 to drive to the other side of the consignment cabinet 12 and load the corresponding consignment compartment 14 from there. A control device 4, 16 can, as required, determine whether this is however expedient owing to a consignment compartment 14 to be occupied, for example on the basis of the ratio of consignment compartments 14 that are still free to consignments that are still to be delivered.

Independently of this, it is still possible for the two free consignment compartments 14 to be filled with consignments 2 by the delivery vehicle 1 as already described. Finally, the lateral closure means 19 are then adjusted so as to securely close off all of the lateral openings 20 of the consignment compartments 14. The corresponding roller doors are thus, in the present case, all fully lowered. In other words, then, all of the lateral closure means 19 are situated in closure positions, which close off the lateral openings 20. The situation illustrated in FIG. 6E can thus result after the loading of the consignment cabinet 12 by the delivery vehicle 1.

Figure 7:
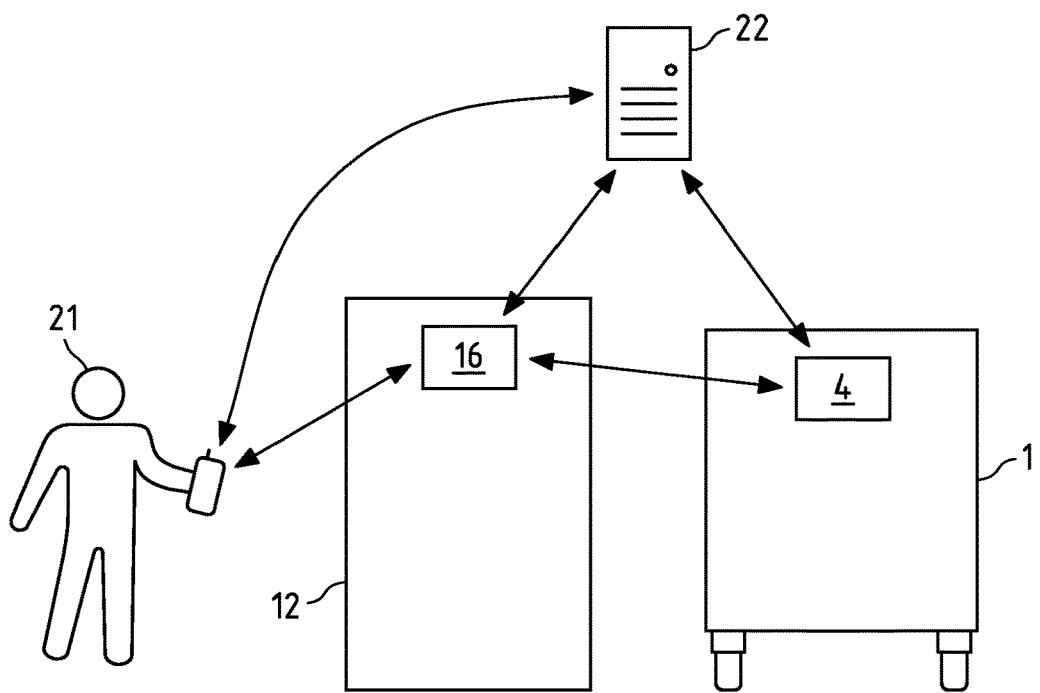
FIG. 7 shows the interaction of different control devices in the execution of a method according to the invention.

FIG. 7 schematically illustrates communication between the consignment cabinet 12 and a delivery vehicle 1, on the one hand, and with a retrieving person 21, on the other hand. Here, the respective communication may take place exclusively directly between the consignment cabinet 12, on the one hand, and the delivery vehicle 1 or the retrieving person 21, on the other hand. The communication may however also take place, at least in part, via an external control device 22, for example via a server or the like. Only some of the possible embodiments will be described below. When new consignments 2 are delivered, it is for example communicated to the delivery vehicle 1 what loading situation is present in the consignment compartments 14, that is to say what distribution the consignments 2 are situated in in the consignment compartments 14. Then, the delivery vehicle 1 can transmit commands to the consignment cabinet 12 as regards how the lateral closure means 19 should be adjusted in order to cause the loading with consignments 2. It is however also possible for the loading situation to be communicated to an external control device 22, which then controls the delivery vehicle 1 and the consignment cabinet 12. If this information is transmitted to an external control device 22, this has the advantage that it is always known to said control device how many consignments 2 can still be delivered to a particular consignment cabinet 12 before a delivery vehicle 1 drives to the consignment cabinet 12. It is basically also possible for merely a status of a particular consignment compartment 14 to be communicated to the external control device 22 when said consignment compartment is emptied or filled. On the basis of these pieces of information, the external control device 22 can itself then determine the present loading situation.

Independently of this, the consignment cabinet 12 may have sensors for monitoring the consignment compartments 14. Said sensors then identify, as required, whether a consignment compartment 14 is occupied or empty. It is however also possible to infer that a consignment compartment 14 is empty if its front closure means 18 has been opened. Then, it must specifically be assumed that a consignment 2 has been removed from the consignment compartment 14, at any rate until the consignment cabinet 12 receives a piece of information regarding a further consignment being placed therein. If a person wishes to store a consignment 2 for retrieval, the person can communicate this to the consignment cabinet 12 or to an external control device 22. Then, the consignment 2 is assigned to a free consignment compartment 14, and the associated front closure means 18 is unlocked and/or opened. Without detecting this using extra means, it can thus be inferred that a consignment 2 has been stored in the consignment compartment 14. It is however also possible for communication to be performed by the delivery vehicle 1, for example on the basis of the position of the plunger unit 9, as regards which consignment compartment 14 a consignment 2 has been displaced into, wherein this piece of information can in turn be transmitted to the control device 16 of the consignment cabinet 12 and/or to the external control device 22.

It may basically suffice for the control device of the consignment cabinet 16 or the external control device 22 to communicate to the control device of the delivery vehicle 4 which consignment 2 is to be displaced from which consignment compartment 14 into which consignment compartment 14, and/or which consignment 2 is to be issued into which consignment compartment 14. Then, the delivery vehicle 1 can control the corresponding processes, without the delivery vehicle 1 being informed of the entire occupancy of the consignment cabinet 12. For this purpose, it is however recommended for information to be transmitted to the consignment cabinet 12 regarding how many consignments 2 are to be placed into different consignment compartments 14, be it by the delivery vehicle 1 itself or by the external control device 22, which may contain pieces of information relating to the loading of the delivery vehicle 1. The control device 16 of the consignment cabinet 12 may then for example firstly adjust the lateral closure means 19 for a particular loading step and then initiate the corresponding loading step directly or via the external control device 22. When the loading step has been completed, this can be signalled by the delivery vehicle 1 to the consignment cabinet 12 directly or via the external control device 22. The control device 16 of the consignment cabinet 12 can then correspondingly update the piece of information relating to the loading situation or relating to the occupancy of the consignment compartments 14, can at least partially adjust the lateral closure means 19 as required, and initiate a further loading step to be performed by the delivery vehicle 1.

During the loading of consignment compartments 12 with new consignments 2, or else merely during the displacement of the consignments 2 in the consignment cabinet 12, it should also always remain certain which individual consignment 2 is situated where, or where said individual consignment has been moved to. Specifically, not only should complete loading of the consignment cabinet 12 be possible, but an individual issue of the consignments 2 to retrieving persons 21 should also be ensured.

The retrieving person 21 receives, from the control device 4, 16 of the consignment cabinet 12 or of the delivery vehicle 1 or from the external control device 22, an access code and, as required, additionally a piece of information relating to the consignment cabinet 12 in which the consignment 2 is stored, for example on their mobile telephone via mobile radio network. The retrieving person can then input this access code on the operator control panel 15 of the consignment cabinet 12 or transmit said access code to the control device 16 of the consignment cabinet 12, which may also be performed via a mobile radio network. This may however also be performed for example by Bluetooth or NFC. The consignment cabinet 12 then opens and/or unlocks the front closure means 18 of the consignment compartment 14 in which the consignment 2 assigned to the access code is situated.

The communication between the retrieving person 21, on the one hand, and the consignment cabinet 12 and/or the external control device 22, on the other hand, may be performed for example via a local radio network or a mobile radio network, for example Bluetooth or Wireless Local Area Network (WLAN) and/or a mobile radio network, in particular Global System for Mobile Communication (GSM), Universal Mobile Telecommunications System (UMTS) and/or Long Term Evolution (LTE). The same applies to the communication between the external control device 22, on the one hand, and the consignment cabinet 12 and/or the delivery vehicle 1, on the other hand. Alternatively or in addition, the communication between the consignment cabinet 12, on the one hand, and the retrieving person 21 and/or the delivery vehicle 1, on the other hand, may also be performed by means of a Radio Frequency Identification (RFID) tag, a Near Field Communication (NFC) tag and/or an in particular two-dimensional barcode, wherein then, the corresponding reading devices for reading out the corresponding information must be provided. Other ways of communication are likewise conceivable.

In particular in the case of autonomous delivery vehicles 1, these preferably have at least one sensor for detecting a consignment cabinet 12 for the delivery of consignments 2 in the consignment cabinet 12. This may be an optical sensor. The sensor makes it possible for the delivery vehicle 1 to drive independently to a location directly adjacent to the consignment cabinet 12 without colliding with the latter. The delivery vehicle 1 can thus preferably assume a predefined relative position with respect to the consignment cabinet 12. Alternatively or in addition, the delivery vehicle 1 may also have at least one sensor for detecting a height level for the delivery of consignments 2 by means of the displacing device 6. This may be the same sensor as the sensor for identifying the consignment cabinet 12. The delivery vehicle 1 can thus adapt the height adjustment of the displacing device 6 to the detected height level of the consignment cabinet 12, wherein this may be a height level of at least one consignment compartment or of a row 13 of consignment compartments 14.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for delivering consignments by means of a delivery vehicle into a consignment cabinet, wherein the consignment cabinet has at least one row of consignment compartments which are arranged adjacent to one another and which serve for receiving at least one consignment, the method comprising the steps of:

stopping the delivery vehicle laterally adjacent to the consignment cabinet;
    activating, via a control device, at least one lateral closure means assigned to at least one consignment compartment,
    performing the activation of the lateral closure means in a manner dependent on the distribution of the consignment compartments occupied with consignments and in order to adjust the lateral closure means from a closure position, in which it closes off a lateral opening of the at least one consignment compartment, into a displacement position, in which it opens up the lateral opening, and
    activating, via a control device of the delivery vehicle, at least one displacing device in order to displace a consignment into a consignment compartment with opened lateral opening;
    wherein the consignment compartments of the at least one row of consignment compartments are separated from one another via the lateral closure means and the lateral closure means are adjustable from the closure position closing the lateral openings of the consignment compartments to the displacement position exposing lateral openings of the consignment compartments in such a way that, in the displacement position, there is a direct connection between adjacent consignment compartments for displacing a mail item from one consignment compartment into an adjacent consignment compartment; and
    wherein the lateral closure means are actuated automatically by the consignment cabinet.

2. The method according to claim 1, further comprising the step of:
    detecting, via a control device of the consignment cabinet, which consignment compartments are occupied with consignments.

3. The method according to claim 2, further comprising the steps of:
    transmitting, via the control device of the consignment cabinet, a piece of information relating to at least one consignment compartment with opened lateral opening for the transfer of a consignment from the delivery vehicle and/or a piece of information relating to the occupancy of consignment compartments with consignments.

4. The method according to claim 1, further comprising the step of:
    handing over a multiplicity of consignments in succession by means of the displacing device of the delivery vehicle to a corresponding multiplicity of consignment compartments arranged adjacent to one another in a row.

5. The method according to claim 4, further comprising the step of:
    transmitting, via the control device of the delivery vehicle, a piece of information relating to the assignment of the handed-over consignments to the consignment compartments receiving the consignments being handed over, in particular to a control device of the consignment cabinet.

6. The method according to claim 1, wherein the delivery vehicle comes to a stop laterally adjacent to a particular one of at least two opposite sides of the consignment cabinet in a manner dependent on the distribution of the consignment compartments occupied with consignments.

7. The method according to claim 1, further comprising the steps of:
    driving the delivery vehicle from one side of the consignment cabinet to the opposite side of the consignment cabinet and comes to a stop there laterally adjacent to the consignment cabinet,
    activating, via the control device at the opposite side of the consignment cabinet, at least one lateral closure means assigned to at least one consignment compartment,
    performing the activation of the closure means via the control device at the opposite side of the consignment cabinet in a manner dependent on the distribution of the consignment compartments occupied with consignments and in order to adjust the closure means from a closure position, in which it closes off a lateral opening of the at least one consignment compartment, into a displacement position, in which it opens up the lateral opening, and
    activating, via the control device of the delivery vehicle, the at least one displacing device in order to displace a consignment into a consignment compartment with opened lateral opening.

8. The method according to claim 1, further comprising the step of:
    transmitting, via at least one detecting device for detecting the completion of the displacement of the consignment into the consignment compartment, a piece of information associated with the completion of the displacement of the consignment into the consignment compartment to a control device, in particular of the delivery vehicle and/or of the consignment cabinet.

9. The method according to claim 1, further comprising the steps of:
- for the handover of a consignment, adjusting a ramp of the delivery vehicle from a non-use position into a use position,
- issuing the at least one consignment to be handed over from a consignment store via a handover device to the ramp situated in the use position, and
- displacing, via the displacing device, the consignment to be handed over via the ramp into a consignment compartment of the consignment cabinet.

10. The method according to claim 1, further comprising the step of:
- adjusting the displacing device, a plunger unit and/or the ramp in height in order to adapt to the height level of a consignment compartment for receiving a consignment.

11. The method according to claim 1, further comprising the step(s) of:
- detecting, via the control device of the consignment cabinet, the removal of a consignment from at least one consignment compartment, in particular on the basis of a piece of information relating to the command for opening and/or relating to the adjustment of a front closure means assigned to the consignment compartment into the removal position, and/or
- directly detecting, via at least one sensor device, a consignment in a consignment compartment.

12. The method according to claim 1, further comprising the steps of:
- activating, via the control device of the consignment cabinet, at least two lateral closure means to both sides of a consignment compartment which has a consignment for the purposes of adjusting from the closure position into the displacement position, and
- displacing, via the displacing device, in particular a plunger unit, the consignment in the respective consignment compartment through a lateral opening into a laterally adjacent consignment compartment.

13. A consignment cabinet for receiving and holding consignments for the separate retrieval thereof, the consignment cabinet comprising:
- a multiplicity of consignment compartments which are arranged adjacent to one another at least in one row and which each serve for receiving at least one consignment,
- wherein at least substantially each consignment compartment has a front opening,
- wherein at least substantially each consignment compartment is assigned a front closure means which is adjustable between a removal position, in which it opens up the front opening for the removal of the consignment from the consignment compartment, and a closed position, in which it closes the front opening,
- wherein at least substantially each consignment compartment has at least one lateral opening,
- wherein at least substantially each consignment compartment is assigned at least one lateral closure means which is adjustable between a closure position, in which it laterally closes the at least one consignment compartment, and a displacement position, in which it enables a consignment to be displaced laterally, and
- wherein the consignment compartments of the at least one row of consignment compartments are separated from one another via the lateral closure means and the lateral closure means are adjustable from the closure position closing the lateral openings of the consignment compartments to the displacement position exposing lateral openings of the consignment compartments in such a way that, in the displacement position, there is a direct connection between adjacent consignment compartments for displacing a mail item from one consignment compartment into an adjacent consignment compartment;
- wherein the lateral closure means are actuated automatically by the consignment cabinet.

14. The consignment cabinet according to claim 13, wherein the consignment compartments are arranged in at least two rows, arranged one above the other, of consignment compartments arranged adjacent to one another.

15. The consignment cabinet according to claim 14, wherein, two consignment compartments arranged one above the other are assigned a common lateral closure means, in particular in the form of a roller door.

16. The consignment cabinet according to claim 13, wherein the front closure means are at least substantially each designed as a pivotable flap, and/or wherein the front closure means are at least substantially assigned to in each case exactly one consignment compartment.

17. The consignment cabinet according to claim 13, wherein the lateral closure means are at least substantially each designed to be adjustable at least substantially in a direction perpendicular to the at least one row of consignment compartments between the closure position and the displacement position, and/or wherein the lateral closure means of at least substantially each consignment compartment of a row of consignment compartments are designed as a roller door, which in particular at least substantially forms a side wall of the consignment compartment.

18. The consignment cabinet according to claim 13, wherein the consignment compartments of a common row of consignment compartments arranged adjacent to one another are designed to be of equal height, equal width and/or equal depth, and/or wherein the consignment compartments of different rows of consignment compartments arranged adjacent to one another are designed to be of different height, different width and/or different depth.

19. The consignment cabinet according to claim 13, wherein the lateral closure means is configured to adjust from the closure position into the displacement position and back, and/or wherein the consignment compartment is configured to detect and/or store a loading situation, and/or wherein a transmitter device for transmitting a piece of information relating to a loading situation of the consignment cabinet and/or relating to the position of at least particular lateral closure means is provided, and/or wherein a receiver device for receiving control commands and/or pieces of information relating to the delivery of at least one consignment by means of a delivery vehicle in the consignment cabinet is provided.

* * * * *